(12) United States Patent
Wang

(10) Patent No.: US 11,530,927 B2
(45) Date of Patent: Dec. 20, 2022

(54) CUSTOMIZING USER INTERFACE EXPERIENCES FOR REQUESTERS OF TRANSPORTATION SERVICES

(71) Applicant: Lyft, Inc., San Francisco, CA (US)

(72) Inventor: George Siqiao Wang, San Mateo, CA (US)

(73) Assignee: Lyft, Inc., San Francisco, CA (US)

( * ) Notice: Subject to any disclaimer, the term of this patent is extended or adjusted under 35 U.S.C. 154(b) by 578 days.

(21) Appl. No.: 16/455,252

(22) Filed: Jun. 27, 2019

(65) Prior Publication Data
US 2020/0408537 A1 Dec. 31, 2020

(51) Int. Cl.
| G01C 21/34 | (2006.01) |
| G08G 1/00 | (2006.01) |
| G06Q 50/30 | (2012.01) |
| H04W 4/02 | (2018.01) |
| H04W 4/30 | (2018.01) |
| H04W 4/40 | (2018.01) |

(52) U.S. Cl.
CPC ....... *G01C 21/343* (2013.01); *G01C 21/3484* (2013.01); *G06Q 50/30* (2013.01); *G08G 1/20* (2013.01); *H04W 4/025* (2013.01); *H04W 4/30* (2018.02); *H04W 4/40* (2018.02)

(58) Field of Classification Search
CPC .............. G01C 21/343; G01C 21/3484; G01C 21/3438; G06Q 50/30; G08G 1/20; G08G 1/202; H04W 4/30; H04W 4/025; H04W 4/40; H04W 4/029; H04W 4/42; H04L 67/306

See application file for complete search history.

(56) References Cited

U.S. PATENT DOCUMENTS

| 2011/0099040 A1* | 4/2011 | Felt ................... G01C 21/3438 715/764 |
| 2017/0024393 A1* | 1/2017 | Choksi .................. G06F 3/0485 |

* cited by examiner

*Primary Examiner* — Marthe Y Marc-Coleman
(74) *Attorney, Agent, or Firm* — Keller Preece PLLC

(57) ABSTRACT

The present disclosure relates to systems, non-transitory computer-readable media, and methods for customizing a user experience for users of a transportation matching system. In particular, in one or more embodiments, the disclosed systems can detect a mobile application session on a requester device, determine information related to a location of a requester device, and then utilize one or more modifications to modify a user interface experience for the mobile application session on the requester device.

20 Claims, 14 Drawing Sheets

CUSTOMIZING USER INTERFACE EXPERIENCES FOR REQUESTERS OF TRANSPORTATION SERVICES

BACKGROUND

In recent years, both popularity and usage of on-demand transportation matching systems have increased. Indeed, the proliferation of web and mobile applications enable requesting individuals to request transportation from one geographic location to another. For instance, an on-demand transportation matching system can receive transportation requests and pair the requests with providers that can transport requesting individuals to destination locations. However, conventional transportation matching systems suffer from a number of disadvantages with respect to managing fluctuations in the demand for and supply of transportation services.

For instance, many transportation systems address fluctuations in demand by merely adjusting the pricing of transportation services. However, using such traditional economic principles to address the problem of managing fluctuations in demand and supply presents a number of problems. For example, responding to supply and demand fluctuations with corresponding price fluctuations leads to an unpredictable user experience, unsatisfied users, and/or a loss of users. Furthermore, conventional systems that use pricing as a one-size-fits-all solution to all demand problems are inflexible. In other words, existing static computational models lack the flexibility to adjust computational logic to modulate demand. Accordingly, these systems lack the ability to accurately and efficiently respond to fluctuations demand and supply for transportation services.

These along with additional problems and issues exist with regard to conventional transportation matching systems.

BRIEF SUMMARY

Embodiments of the present disclosure provide benefits and/or solve one or more of the foregoing or other problems in the art with systems, non-transitory computer-readable media, and methods for providing customized user interfaces and experiences in a way that dynamically adapts to fluctuations in supply and demand. In one or more embodiments, the system determines that the demand for a service in a given geographical area for a given timeframe will exceed the supply in that area for that timeframe, and to what degree. The system can then utilize this demand severity information and information related to potential requesters to identify and implement modifications to a standard user experience (e.g., by customizing one or more user interfaces, and/or a user interface flow) for one or more potential requesters of the service. For instance, the system can utilize information associated potential requesters to target one or more particular requesters. Furthermore, the system can utilize information associated with the targeted requesters to identify one or more particular modifications to the standard user experience (e.g., from a plurality of possible modifications) to apply for each of the targeted requesters. In one or more embodiments, the system further determines which modifications to apply based on demand severity and information associated with the potential transportation requests.

To illustrate, in some embodiments, the disclosed transportation matching system can detect a mobile application session on a requester device and detect a location of the requester device. Based on the detected session and location, the transportation matching system can determine a demand severity metric and identify, based on the demand severity metric, one or more modifications to a user interface experience for the mobile application session. The transportation matching system can then utilize at least one of the modifications to modify the user interface experience on the requester device.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
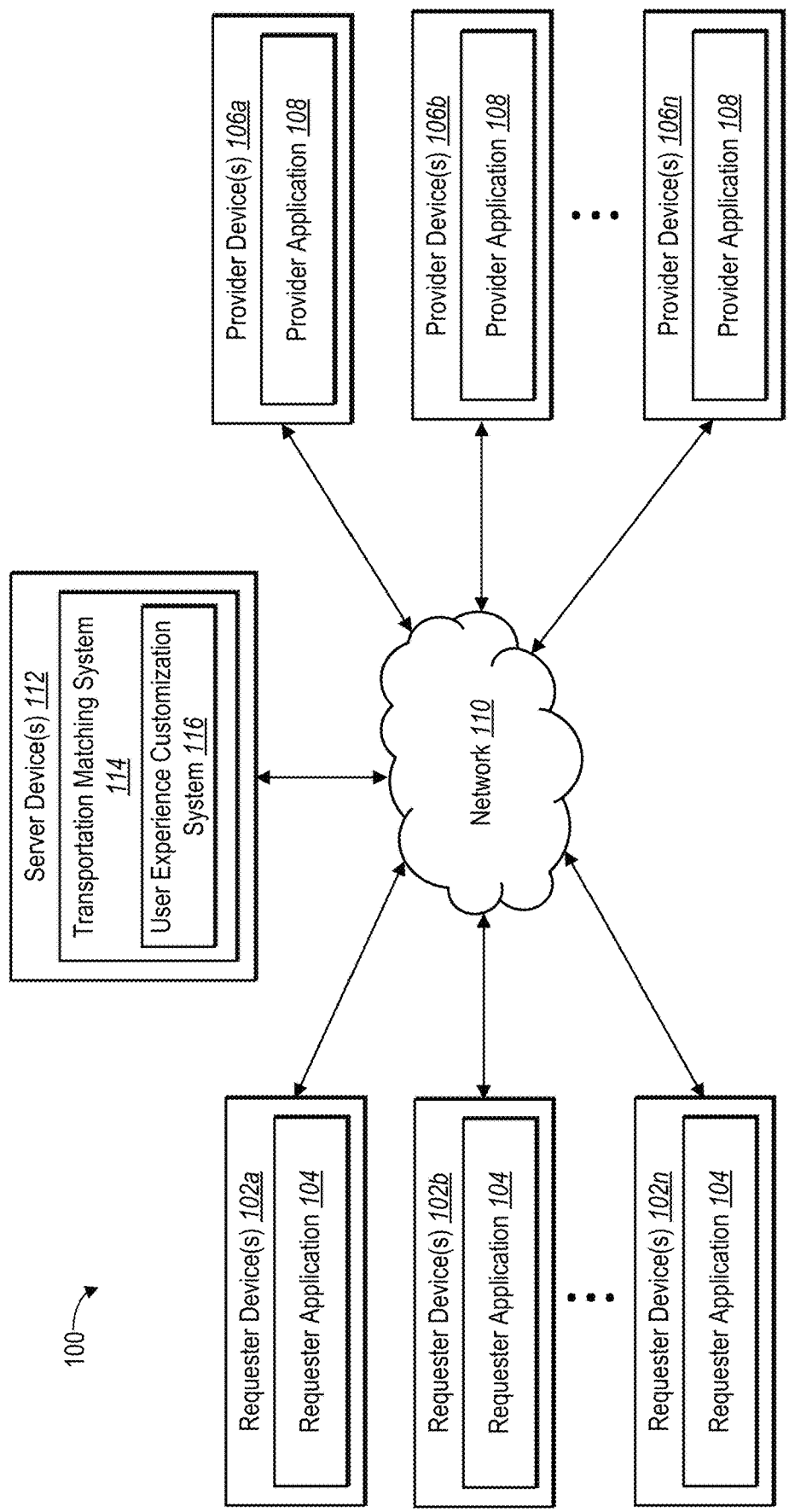
FIG. 1 illustrates a diagram of an environment in which a transportation matching system can operate in accordance with one or more embodiments.

This disclosure describes one or more embodiments of a dynamic transportation matching system that dynamically customizes user interfaces and user interface flows based on fluctuations in demand. In particular, the disclosed dynamic transportation matching system can monitor demand and supply in a given area in real time. Using gathered information, the dynamic transportation matching system can determine demand severity (e.g., for the given area, for a given time, or for a particular transportation request). Based on high demand, the transportation matching system dynamically customizes user experiences to mitigate the demand. For instance, the transportation matching system can determine how many and which requesters to target based on the demand, information associated with the requesters, and information associated with requests. The transportation matching system can also take these factors into consideration when determining what modifications to make for a given targeted requester.

For example, in some embodiments, the transportation matching system can detect a mobile application session on a requester device. The transportation matching system can also determine the location of the requester device. Then, based on that requester device's location, the transportation matching system can determine a demand severity metric for the location and/or for a corresponding transportation request. Further, in one or more embodiments, the transportation matching system identifies modifications to a user interface experience for the requester mobile application session based on the demand severity metric. The transportation matching system can then apply these modifications to the mobile application session.

As mentioned, the transportation matching system can identify requesters to target with user interface flow modifications. In one or more embodiments, the transportation matching system determines scores for requesters based on characteristics from user profiles and/or characteristics of requested transportation. For example, the transportation matching system can determine scores based on user ratings, the length of the potentially requested transportation, previous transportation requests, responses to prior user experience modifications, or other user characteristics and data. Based on these scores, the transportation matching system can determine which users to target with modifications to the user interface experience. For example, using the scores, the transportation matching system can determine which and how many requesters to target in a given area based on demand severity and based on a determined effectiveness for modifications. In one or more embodiments, the transportation matching system utilizes one or more predetermined thresholds, and targets users with scores below a predetermined threshold and/or determines not to target users with scores above a predetermined threshold. In one or more other embodiments, the transportation matching system compares user scores in an area, and targets users based on the comparison.

Further, the transportation matching system can utilize a wide variety of modifications in response to fluctuations in demand. For example, the transportation matching system can modify a user experience to include a user interface including an offer/incentive to delay their transportation request until a time with lower demand. As another example, the transportation matching system can also modify a user experience to include a notification of the high demand as well as an option to schedule the user's transportation request for a future time with an expected lower demand and at a lower rate. Further, in one or more embodiments, the transportation matching system can introduce additional steps to a user interface experience, such as additional confirmation screens, advertisements, and/or prompts for requester action. The transportation matching system can also modify the user interface experience to present an offer or incentive for the requester to travel (e.g., using an alternate means of transportation) to an area with lower demand.

Additionally, in one or more embodiments, the transportation matching system monitors the use and effectiveness of modifications to a user interface experience over time. For instance, the transportation matching system can track each use of a modification or combination of modifications as well as a corresponding result. Accordingly, for example, the transportation matching system is able to predict the result of implementing a modification based on the historical data associated with the modification. In some embodiments, the transportation matching system generates one or more metrics to represent result of implementing a modification or combination of modifications. For example, the transportation matching system might generate a metric representing a change in conversion rate (e.g., the rate of mobile application sessions resulting in a submitted transportation request), an acceptance rate (e.g., a rate at which users accept provided offers or incentives), a change in usage (e.g., a change in how often a requester uses the transportation matching system after experiencing a modification), a change in revenue for a given user or geographical area, and/or other metrics representing the short- and long-term effects of implementing modifications to the user interface experiences of requesters. In some embodiments, the transportation matching system generates metrics specific to a particular user, a particular group of users, and/or a particular location. Accordingly, the transportation matching system is able to determine the granular effects of modifications and then use this information to customize and optimize future use of modifications for a particular user or area.

In yet further embodiments, the transportation matching system can classify each modification based on the effectiveness of the modification (e.g., in reducing demand and/or in reducing a predicted conversion rate for a user) and/or based on any detriment of the modification (e.g., a loss in long-term revenue, a loss of users, and/or a reduction in user retention). For instance, the transportation matching system can classify each modification as having a low effectiveness, a medium effectiveness, or a high effectiveness. Similarly, the transportation matching system can classify each modification as having a low detriment, a medium detriment, or a high detriment. In additional or alternative embodiments, the transportation matching system can rank modifications based on effectiveness and based on detriment. Using the information regarding the effectiveness and detriment of the modifications, the transportation matching system can intelligently decide which modifications to utilize in a given situation to modulate demand.

For instance, the transportation matching system can select modifications with an aim to maximize effectiveness and minimize detriment. Furthermore, the transportation matching system can adapt to demand severity in selecting modifications to utilize. For instance, the transportation matching system can escalate the use of modifications (e.g., by selecting modifications corresponding to a greater risk of long-term detriment) as demand severity dictates and/or if initial modifications are insufficient or unsuccessful in modulating demand. That is, the transportation matching system can balance effectiveness vs. detriment by utilizing modifications with the least detriment (e.g., the lowest risk to long-term user retention and revenue) while ensuring that the demand is sufficiently modulated in the applicable region.

The transportation matching system provides many advantages and benefits over conventional systems and methods. For example, by utilizing various modifications to modulate requester demand the transportation matching system improves accuracy, efficiency, and flexibility relative to other systems. Specifically, rather than merely using pricing changes in an attempt to lower demand to meet available supply, the transportation matching system is able to utilize a variety of user interface flow modifications, and can determine how many modifications to apply, which modifications to apply, and what requesters to target with modifications. Using modifications to the standard user experience, the dynamic transportation matching system is able to modulate high demand and under supply by, for example, decreasing conversion rates for mobile application sessions (i.e., the rate that a mobile application session results in a serviced transportation request). This allows the transportation matching system to remedy fluctuations in supply and demand in a more effective, predictable, and flexible manner than previously available. Further, the flexibility of the transportation matching system allows it to accurately and efficiently respond in a variety of quickly changing circumstances. Furthermore, by effectively modulating demand in this way, the transportation matching system is able to preserve and reduce the use of computational resources by, for example, minimizing cancellation rates that typically accompany periods of excess demand.

As illustrated by the foregoing discussion, the present disclosure utilizes a variety of terms to describe features and advantages of the transportation matching system. Additional detail is now provided regarding the meaning of such terms. For example, as used herein, the term "transportation matching system" refers to a system that matches transportation requests (e.g., each specifying a request for transportation from a pickup location to a dropoff location) received from requester devices to transportation provider devices available to service the transportation requests. In particular, the term "transportation matching system" can include a system comprising one or more server devices that communicate with requester devices and provider devices to identify transportation requests and facilitate fulfillment of the requested transportation services. To illustrate, a transportation matching system can identify transportation requests, identify potential transportation provider devices, determine locations of requester devices and provider devices, and match provider devices and requester devices based on a variety of criteria.

Additionally, as used herein, the terms "requester device" and "requester device" refers to a computing device associated with a requester (e.g., a person that uses the transportation matching system to request transportation services). In particular, the term "requester device" can include a mobile device, such as a laptop, smartphone, or tablet associated with a requester, but the requester device may be any type of computing device. Furthermore, a requester device typically implements an application (e.g., a mobile or web application) that facilitates use of the transportation matching system to request transportation services.

Further, as used herein, the term "requester" refers to a user associated with a requester device. The requester uses the requester device to submit transportations requests to the transportation matching system. In some embodiments, the transportation matching system maintains data associated with the requester, such as user profile data and historical data indicating historical use by the requester of the transportation matching system and/or a corresponding requester application. For example, the historical data can include statistics and other data indicating how a requester is likely to interact with the transportation matching system in the future (e.g., based on past transportation requests). In some embodiments, the historical data can indicate how the requester has reacted to past instances, in which the transportation matching system has modified a standard user experience. To illustrate, the transportation matching system can monitor changes in requester behavior (e.g., changes in a likelihood that a requester will submit a transportation request) in response to modifications to a user interface experience by the transportation matching system. Moreover, the transportation matching system can determine an effectiveness of past modifications, either individually or collectively. In this way, the transportation matching system can determine how a requester is likely to respond to future modifications and can more accurately use future modifications.

Also, as used herein, the terms "transportation request" and "request" refer to a requester using a requester device to submit a request for transportation services to the transportation matching system. To illustrate, a requester can interact with one or more user interfaces of a requester application to configure a transportation request (e.g., to indicate a requested pickup location, a requested dropoff location, a requested type of transportation, and/or a requested time of transportation), and then submit the transportation request to the transportation matching system.

Additionally, as used herein, the term "mobile application session" refers to an instance of use of a mobile application. In particular, the term "mobile application session" can begin when a user opens a mobile application (e.g., a requester application) and begins using the mobile application to, for example, configure and submit a transportation request to the transportation matching system. To illustrate, a mobile application session can include various acts including opening the mobile application, configuring a transportation request, interactions with one or more aspects of a graphical user interface, receiving information via the mobile application, sending a transportation request, providing updated information during transportation, and/or facilitating payment for the requested transportation. During a mobile application session of a requester device, the requester device can communicate with the transportation matching system to provide information to the transportation matching system (e.g., information associated with user inputs and interactions received from the requester, and information associated with a location of the requester device) and receive information from the transportation matching system (e.g., information associated with pricing, estimated provider arrival times, and provider locations). Using information received from both requester devices and provider devices, the transportation matching system is able to monitor the supply of and demand for transportation services in real time. Furthermore, as explained in more detail herein, the transportation matching system is able to dynamically modify a requester's user experience (e.g., by modifying one or more user interfaces or a user interface flow) to help modulate times of excess demand.

Also, as used herein, the term "demand severity metric" refers to a score, ranking, classification, or other metric indicative of supply relative to demand. In particular, the term "demand severity metric" can include a score generated by the transportation matching system to reflect whether and to what degree demand within a particular geographical area exceeds supply. To illustrate, the transportation matching system can utilize forecasts as well as real-time information (e.g., received from requester devices and provider devices) to determine a number of actual and expected transportation requests as well as a number of providers that are or will be available to service the transportation requests. The transportation matching system is then able generate a demand severity metric to represent, for example, whether and to what extent demand exceeds supply. In some embodiments, a demand severity metric is specific to a particular geographic area (e.g., a particular geohash or neighborhood of geohashes) and/or particular period of time (e.g., a 5-, 10-, or 30-minute time interval).

Further, as used herein, the term "user interface experience" refers to a default or typical presentation of graphical user interfaces within an application. In particular, the term "user interface experience" refers to a defined set and flow (e.g., order and timing) of user interfaces and user interface elements, with which a requester typically interacts and through which a requester typically navigates when using a requester application (e.g., to configure and submit a transportation request). Moreover, a user interface experience can include variations (e.g., depending on user input) that are part of the user interface experience. To illustrate, a requester may be presented with a different user interface or may experience a different order of user interfaces if the requester selects one option vs. another.

As mentioned above, in some embodiments, the transportation matching system identifies and applies one or more modifications to a user interface experience. As used herein, the term "modification" refers to any change to a user interface experience. For example, a modification can include a change in what user interfaces or user interface elements a requester typically sees or a flow of user interfaces a requester typically experiences. To illustrate, a modification can include adding a user interface to the user interface experience, adding user interface elements to a user interface, or changing an order of user interfaces. As a result of a modification, a requester may be required to provide additional user input, perform additional actions, and/or provide additional information in order to complete the user interface experience (e.g., to configure and submit a transportation request).

Also, as used herein, the term "user profile information" refers to information associated with a user account. To illustrate, the term "user profile information" can include information associated with a user's preferences, ratings, locations, and/or historical use of the transportation matching system.

Additional detail will now be provided regarding the transportation matching system in relation to illustrative figures portraying exemplary embodiments. In particular, FIG. 1 illustrates an environment 100 including requester devices 102a-n (collectively referred to herein as "requester devices 102"), each implementing a requester application 104, and provider devices 106a-n (collectively referred to herein as "provider devices 106"), implementing a provider application 108. The requester devices 102 communicate, via a network 110, with server devices 112. The server devices 112 can implement a transportation matching system 114, which in turn can include the user experience customization system 116.

Although FIG. 1 illustrates the user experience customization system 116 implemented via the server devices 112, the user experience customization system 116 can be implemented via other components. For example, the user experience customization system 116 can be implemented in whole, or in part, by the requester devices 102.

The requester devices 102 can include various types of mobile computing devices. For example, the requester devices 102 can include smart phones, tablets, smart watches, laptop computers, or other mobile computing devices, such as further explained below with reference to FIG. 7. Additionally, the requester application 104 can include any one of various types of requester applications. For example, the requester application 104 can be web application (e.g., accessed using a web browser) or a native application provided by the transportation matching system 114 for communicating with and accessing the services of the transportation matching system 114 (e.g., to request transportation). Similarly, the provider devices 106 can include various types of mobile computing devices and vehicle computing devices, and the provider application 108 can include a web or native application for communicating with and accessing the services of the transportation matching system 114 (e.g., to provide transportation services to one or more requesters). Additionally, the server devices 112 can include one or more computing devices, such as those explained below with reference to FIG. 7.

The requester devices 102, provider devices 106, and transportation matching system 114 may communicate by way of the network 110, which can include one or more communications networks using communication platforms and technologies suitable for transporting data and/or communication signals, examples of which are described with reference to FIG. 8.

The transportation matching system 114 dynamically matches transportation requests received from requesters (e.g., requesters associated with requester devices 102) with available transportation service providers (e.g., transportation providers associated with the provider devices 106). One will appreciate that the supply of transportation providers does not always match the demand of transportation requesters. Accordingly, the transportation matching system 114 can perform various actions for increasing supply and/or decreasing demand when there is excess demand for a particular geographical area and period of time For example, the transportation matching system 114 may adjust pricing offered to transportation requesters and/or provide incentives to transportation providers to decrease demand and/or increase supply for a given area and period of time. However, as mentioned above, using only monetary means to modulate a supply and demand imbalance introduces its own problems, inefficiencies, inflexibilities, and other problems. In accordance with embodiments disclosed herein, in addition to using other means to modulate demand, the transportation matching system 114 utilizes the user experience customization system 116 to modulate demand by modifying user experiences for requesters. For instance, the user experience customization system 116 can determine and implement modifications to a user interface experience (e.g., to add to, change, or rearrange the user interface experience), as explained in more detail herein.

Figure 2:
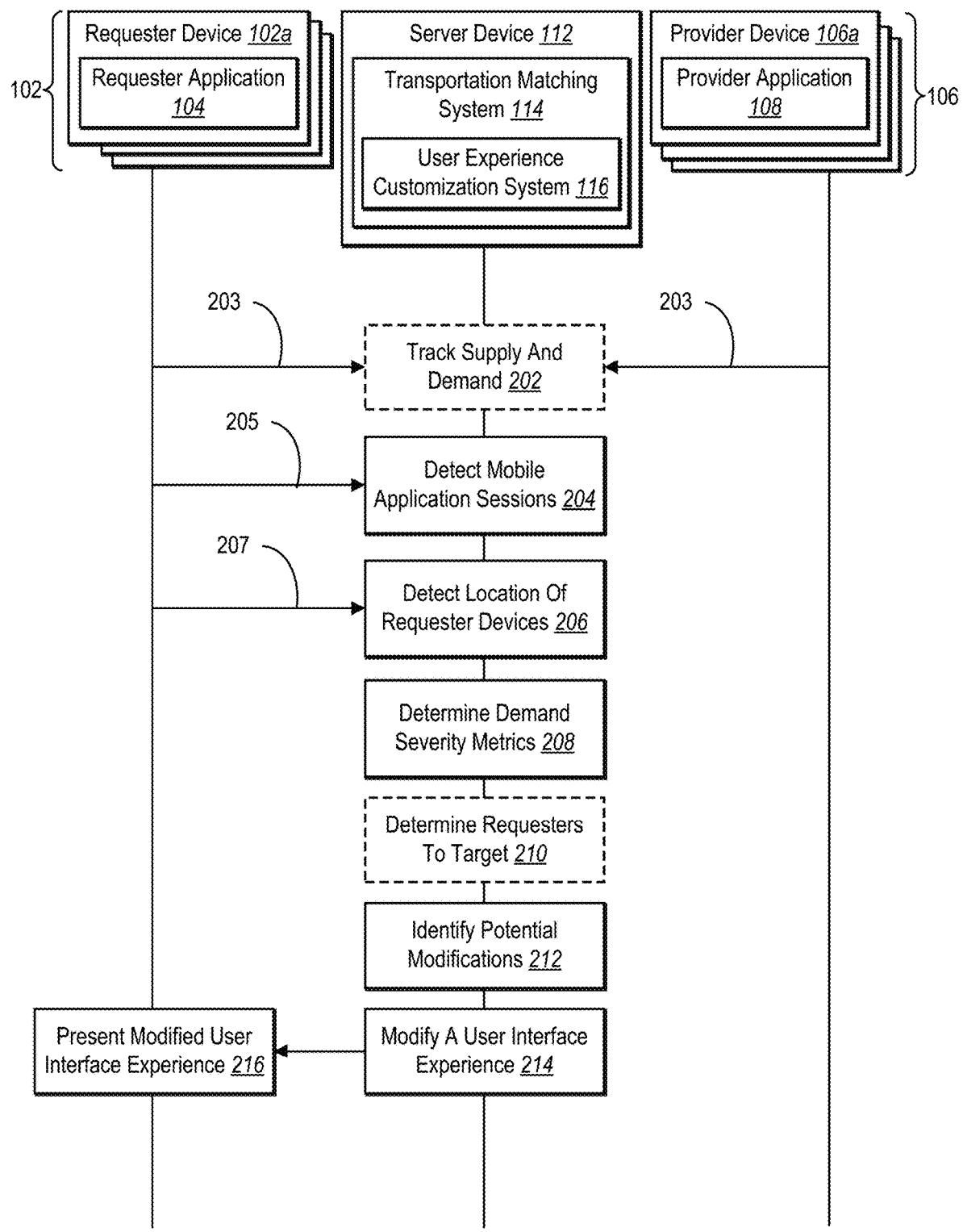
FIG. 2 illustrates a schematic diagram of a sequence of steps in accordance with one or more embodiments.

FIG. 2 illustrates a schematic diagram of an example sequence of steps for customizing a user experience to modulate demand in accordance with one or more embodiments of the present disclosure. In FIG. 2, blocks with dashed borders are used to illustrate optional features or operations that add additional features to embodiments of the disclosure. Such notation, however, should not be taken to mean that these are the only options or optional operations, and/or that blocks with solid borders are not optional in certain embodiments of the disclosure. As shown in FIG. 2, in accordance with step 202, the transportation matching system 114 tracks supply and demand. For instance, the transportation matching system 114 can utilize a combination of information 203 collected in real-time (e.g., from requester devices 102 and provider devices 106) as well as forecasts (e.g., based on historical data and forecasting models) to determine current supply and demand conditions as well as forecast supply and demand conditions for future time periods. In some embodiments, the transportation matching system 114 continuously or near continuously (e.g., at given time intervals) updates supply and demand determinations. Using a combination of information 203 gathered in real-time and forecasts based on historical data, the transportation matching system 114 is able to accurately determine both current as well as future supply and demand conditions for various geographical areas (e.g., geohashes) and periods of time.

As further illustrated in FIG. 2, in accordance with step 204, the transportation matching system 114 detects mobile application sessions associated with the requester devices 102. For example, based on communications 205 with the requester devices 102, the transportation matching system 114 is able to detect which of the requester devices 102 have the requester application open and being used by requesters (e.g., to configure a transportation request or access information about available transportation services). During the detected mobile application sessions, the transportation matching system 114 is able to determine a status of each mobile application session, information associated with the requester devices 102, and information associated with information gathered by the requester application 108. For example, the transportation matching system 114 can utilize information received from the requester devices 102 to determine a current user interface being displayed, a current position/stage within a user interface flow, a selected pickup location, a selected dropoff location, and/or a selected type of requested transportation. Utilizing the gathered information, the transportation matching system 114 is able to determine, among other things, how likely each mobile application session is to result in a submitted transportation request as well as the details of the transportation request. To illustrate, for a detected mobile application session on the requester device 102a, the transportation matching system 114 can determine an expected pickup time, an expected pickup location, and an expected dropoff location for a transportation request being configured on the requester device 102a.

Furthermore, according to step 206, the transportation matching system 114 is able to detect locations of the requester devices 102. For instance, in some embodiments, the requester devices 102 can utilize Global Positioning System (GPS) or other technologies to determine geolocation information for the requester devices 102. The requester devices 102 can then communicate 207 the determined geolocation information to the transportation matching system 114. Using the provided geolocation information, the transportation matching system 114 can detect the location of the requester devices 102. In some embodiments, the transportation matching system 114 further determines in which geohashes the requester devices 102 are located. Furthermore, using the detected locations of the requester devices 102 with current mobile application sessions, the transportation matching system 114 can update supply and demand determinations (e.g., current and/or future forecasts) to reflect the demand likely to result from the mobile application sessions.

As shown in step 208, determines a demand severity metric. For example, based on information gathered from the requester devices 102 and provider devices 106, the transportation matching system can calculate a demand severity metric for each of a plurality of geographical areas. Furthermore, either before or in response to a detected mobile application session from one of the requester devices 102, the transportation matching system 114 can determine a demand severity metric applicable to the corresponding requester device. To illustrate, in response to detecting a current mobile application session on the requester device 102a and based on information gathered during the mobile application session, the transportation matching system 114 can determine or update a demand severity metric for the location of the requester device 102a. The transportation matching system 114 can determine the demand severity metric for the geographical area of the requester device 102a based on a number of current and potential transportation requests from requester devices in the geographical area and based on a number of transportation providers that are or will soon be available to service transportation requests from the geographical area. The determined demand severity metric can represent a measure of excess demand for the geographical area at the current time. Furthermore, the transportation matching system 114 can determine demand severity metrics for future time periods (e.g., by forecasting supply and demand conditions for the future time periods).

Accordingly, the transportation matching system 114 is able to determine whether a demand severity metric for a given geographical area is likely to improve or worsen in the future.

Using the determined demand severity metrics, the transportation matching system 114 is able to determine whether corrective action is necessary to modulate demand for a given geographical area and period of time. For example, the transportation matching system 114 can compare a determined demand severity metric to one or more demand severity thresholds to determine whether and to what extent the demand severity metric merits corrective action. If the transportation matching system 114 determines that it is necessary to modulate demand for a geographical area and time period, the transportation matching system 114 can utilize the user experience customization system 116 to help modulate the demand. For example, the transportation matching system 114 can utilize the user experience customization system 116 to customize a standard user experience for one or more requesters to help reduce and/or delay demand for the geographical area.

As shown in step 210, in some embodiments, the user experience customization system 116 can determine requesters to target with a customized user experience. More specifically, the user experience customization system 116 can determine, based on the demand severity metric, how many requesters to target and which users to target. As will be discussed in greater detail below with regard to FIG. 3, the user experience customization system 116 can determine how many users to target based on the demand severity metric and the effectiveness of modifications in modulating the demand. Additionally, the user experience customization system 116 can utilize ride data and requester data for requesters to determine which requesters to target with a modified user experience. For example, the user experience customization system 116 can target users requesting particularly burdensome transportation or can exempt requesters with high user ratings or consistent use.

Additionally, as shown in step 212 of FIG. 2, the user experience customization system 116 identify modifications to utilize in customizing a user experiences for targeted requesters. Based on a demand severity metric and user profile information for a targeted requester, the user experience customization system 116 can determine modifications to the user interface experience for the requester device. For example, in one or more embodiments, the user experience customization system 116 utilizes data regarding the effectiveness of previous modifications on the requester to identify modifications most likely to be effective on the requester. Further, the user experience customization system 116 can determine modifications to the standard user experience based in part on the demand severity metric. For example, in one or more embodiments, the user experience customization system 116 implements more "severe" modifications with higher effectiveness, but potentially higher long-term detriment only when the demand severity metric is high enough to merit such "severe" modifications.

Upon receiving the user experience modifications, as shown in step 214 of FIG. 2, the user experience customization system 116 can modify a user interface experience for a targeted requester using the identified modifications. As will be discussed in greater detail with regard to FIGS. 5A-5G, the user experience customization system 116 can add additional steps or user interfaces, require additional requester actions, and/or modify a design or sequential aspects of a user interface experience for requesters. For example, the user experience customization system 116 can present incentives for requesters to delay or abandon a potential transportation request, can create "friction" by presenting additional screens such as confirmations or advertisements, can suggest an alternate transportation type for all or part of the trip, and/or present various other modifications to the user interface experience. Furthermore, the user experience customization system 116 can cause the requester devices 102 to present the modified user interface experiences, as shown in step 216. Although not shown in FIG. 2, if initial modifications prove unsuccessful and/or if demand severity increases, the user experience customization system 116 can further modify the user interface experience for targeted requesters until a achieving a desired objective (e.g., a decrease in demand severity).

Additionally, in one or more embodiments, upon determining requesters, the user experience customization system 116 can queue the requesters in a digital queue for provider services. The user experience customization system 116 can provide or not provide this queue information to the requesters. As part of modifying the user interface experience, the user experience customization system 116 can modify a user's location in the digital queue in order to delay their access to provider services. For example, the user experience customization system 116 can move the user's location in the digital queue in response to the requester accepting an offer to wait in exchange for a lower rate or in exchange for a discounted drink nearby.

Figure 3:
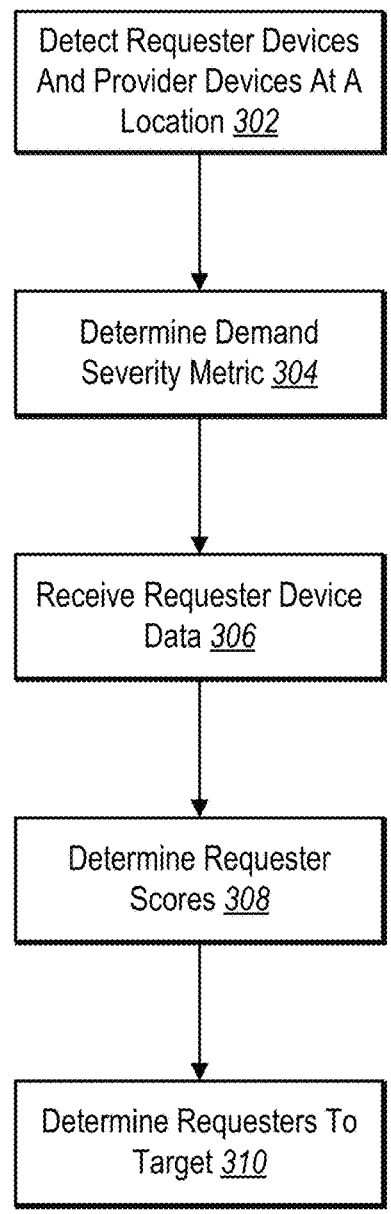
FIG. 3 illustrates an example method for determining requesters to target with user experience modifications in accordance with one or more embodiments.

As discussed briefly above, the user experience customization system 116 can determine what requesters in a given area to target (e.g., based on user profile information, information associated with requested transportation, and demand severity). FIG. 3 shows an example method for determining requesters to target with modifications to the user interface experience, including the series of acts 300. For example, as shown in FIG. 3, the user experience customization system 116 can perform step 302 of detecting requester devices and provider devices at a location. As discussed above with regard to FIG. 2, the user experience customization system 116 can receive information from requester devices 102 and provider device 106 to determine how many transportation requests are likely to be made in a specified area in a given time, and how many providers will be available to service those requests.

Based at least in part on these detected devices, the user experience customization system 116 can perform step 304 of determining the demand severity metric. As noted above, the user experience customization system 116 can determine a demand severity metric that reflects the degree to which potential requests in a specific geographical area outnumber potential service providers in that area. The user experience customization system 116 can determine this metric based on the number of requester devices 102 and provider devices 106 active in the area. The user experience customization system 116 can also utilize received inputs from both requester devices 102 and provider devices 106 to estimate the likelihood that the requester devices 102 are going to request a ride soon and the likelihood that the provider devices 106 will be present in the area and available at the time of the potential requests to provide services.

Further, the user experience customization system 116 can also consider user profile data when determining the demand severity metric and/or which requesters to target. To illustrate, in one or more embodiments, the user experience customization system 116 utilizes data regarding past requests that a requester device 102 has made when at its current location or at the current time. For example, a user may frequently request transportation from their workplace to their home at 5:15 pm. Accordingly, when determining a demand severity metric at 5:10 pm, even if the requester device 102 is not yet active, the user experience customization system 116 may determine a likelihood that the requester device 102 will make the typical request at 5:15 pm and may utilize this likelihood in determining the demand severity metric for the area. More broadly, the user experience customization system 116 may consider a typical demand severity metric for a given time and location, as well as any events or holidays when determining the current demand severity metric.

Additionally, the user experience customization system 116 may perform step 306 of receiving requester device data. More specifically, the user experience customization system 116 can identify various potential requesters and receive data from each of the requester devices 102. For example, in one or more embodiments, the user experience customization system 116 receives data from one or more user profiles associated with the requester devices 102. To illustrate, the user experience customization system 116 can receive data from user profiles associated with the requester devices 102 reflecting a requester rating, typical requester behavior and/or patterns, requester tipping averages, requester demographics, past requester responses to modifications to the user interface experience, or any other data related to characteristics of a user profile.

Additionally, the user experience customization system 116 can receive data regarding user inputs from active mobile application sessions on the requester devices 102. To illustrate, the user experience customization system 116 can receive data regarding inputs indicating potentially requested rides from these active mobile application sessions. For example, the user experience customization system 116 can identify the length in distance and/or time of a potentially requested ride, a potential value of the potentially requested ride, how much time the user is taking in processing their request, and any other data related to the potentially requested ride and the mobile application session.

Additionally, as shown in FIG. 3, upon receiving the requester device data, the user experience customization system 116 can perform step 308 of determining requester scores. For example, the user experience customization system 116 can generate scores indicating how advantageous it would be for the user experience customization system 116 to modify the user interface experience for a given requester (e.g., based on likely effectiveness and/or likely detriment of making the modification). The user experience customization system 116 can utilize any information associated with the requester and a potential transportation request from the requester, to generate the requester score. To illustrate, the user experience customization system 116 can determine a requester score based on how valuable the requester is as a customer, how valuable the potential transportation request is, whether the potential transportation request will take a transportation provider from a high demand area to a low demand area, how likely a modified user experience is to have a long-term detrimental effect on the requester, and/or how likely a modified user experience is to be effective.

Then, as shown in FIG. 3, the user experience customization system 116 can perform step 310 of determining requesters to target. More specifically, upon determining scores for each of the requester devices 102 in a specific geographic area, the user experience customization system 116 can determine, based on a comparison of requester scores and the demand severity metric, how many requesters to target with modifications to the user interface experience, and which users to target. In one or more embodiments, the user experience customization system 116 determines how many users to target based on the demand severity metric, the effectiveness of modifications, and the user profile information for requesters in the area. That is, the user experience customization system 116 determines how many requests from the requester devices 102 should be eliminated in order to modulate the demand to match supply, and how many requester devices 102 should be targeted in order to eliminate that many requests. As mentioned above, the user experience customization system 116 can consider the particular requester devices 102 present in the area. For example, if the user experience customization system 116 receives data indicating that modifications are very effective at modulating demand among several of the requesters in the area, the user experience customization system 116 may determine that fewer requesters should be targeted.

Additionally, in one or more embodiments, the user experience customization system 116 determines which users to target based on a threshold value. More specifically, the user experience customization system 116 can utilize a threshold requester score, to which the user experience customization system 116 compares requester scores to identify which requesters to target. The user experience customization system 116 can also utilize a threshold requester score, to which the user experience customization system 116 compares requester scores to determine whether the requesters should be exempt from modifications to the user interface experience (e.g., because they are too valuable as customers).

In one or more other embodiments, the user experience customization system 116 can compare requester scores for each of the requester devices 102 and target users with the lowest scores. More specifically, the user experience customization system 116 can determine the optimal number of requester devices 102 to target with modifications to the user interface experience and can then target that number of requester devices 102 with the lowest requester scores. In other words, the user experience customization system 116 can categorize various requester devices 102 according to their requester scores relative to the other requester devices 102 in the area.

The user experience customization system 116 can also utilize multiple thresholds or multiple scoring categories for various types of modifications to the user interface experience. For example, in one or more embodiments, the user experience customization system 116 determines a first requester score threshold and targets requester devices 102 below that threshold with severe modifications to the user interface experience. Then, in these one or more embodiments, the user experience customization system 116 determines a second requester score threshold and targets requester devices 102 with requester scores between the first and second threshold with minor modifications to the user interface experience. Similarly, in one or more other embodiments, the user experience customization system 116 categorizes requester devices 102 into three or more categories according to their requester scores relative to other requester devices 102 in the area.

Figure 4:
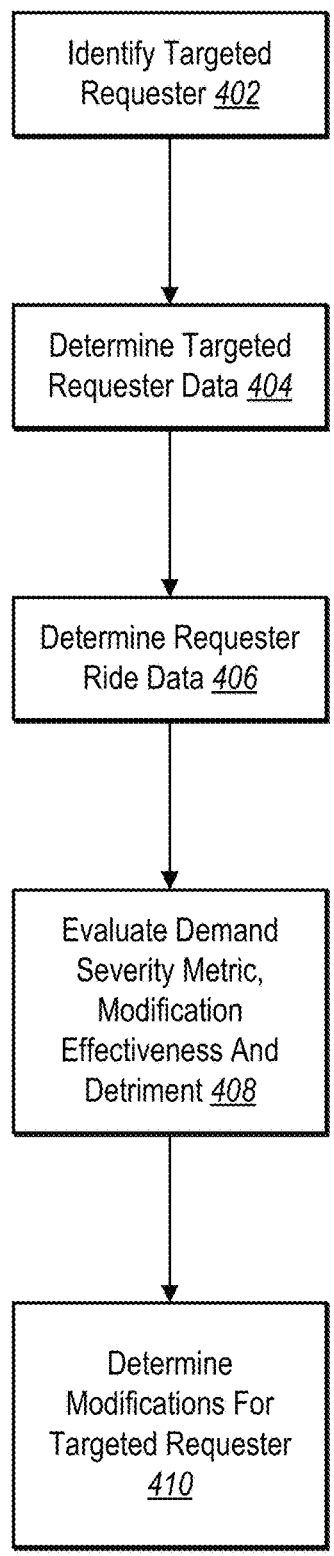
FIG. 4 illustrates an example method for determining modifications for a targeted requester in accordance with one or more embodiments.

As discussed above, the user experience customization system 116 can determine what modifications to apply to a user experience to most effectively reduce demand among targeted users. For instance, FIG. 4 illustrates a method for determining modifications for a targeted requester in accordance with one or more embodiments. As shown in FIG. 4, then the system may perform step 402, of identifying a targeted requester. As discussed above with regard to FIG. 3, the system can identify how many and which potential requesters to target with modifications to the user interface experience. Upon determining which requester devices 102 to target, the user experience customization system 116 can identify each requester device 102a individually in order to optimize modifications for that particular requester device 102a.

Additionally, as shown in FIG. 4, the user experience customization system 116 can perform step 404 of determining the targeted requester data. Similarly to receiving data as discussed above with regard to FIG. 3, the user experience customization system 116 can receive data from user profiles associated with the targeted requester devices 102 reflecting a requester rating, typical requester behavior and/or patterns, requester tipping averages, requester demographics, past requester responses to modifications to the user interface experience, or any other data related to characteristics of a user profile.

Further, as shown in FIG. 4, the user experience customization system 116 can perform step 406 of determining requester ride data. In one or more embodiments, this data may include ride data already received via the requester devices 102. This data may also include request history from the requester devices 102 indicating rides commonly requested around the current time or from the location of the requester devices 102.

The user experience customization system 116 can utilize location information from a transportation request from the requester device to determine whether to target the requester device with modifications based at least in part on location information for the ride route and/or ride destination. For example, the user experience customization system 116 can identify information associated with the user's requested destination and then determine whether to target the user with modifications to a user interface experience accordingly. To illustrate, the user experience customization system 116 can determine a demand severity metric associated with the requested destination and/or a predicted value of a provider being added to an area including the requested destination. Based at least in part on the demand within the area and/or the predicted value of the provider moving to the area, the user experience customization system 116 can determine whether to exempt a user from being targeted with a modified user interface experience. That is, if the user's request will move the provider to another high-demand area and/or if the user's request will keep the provider within the same high-demand area, the user experience customization system 116 can determine not to target the user with modifications based on the request keeping the provider within a high-demand/high-value area and consequently maintaining efficiency and profitability for the provider. In some embodiments, the user experience customization system 116 can rank each user based on the demand and/or value associated with the user's requested destination location and then use the ranking to select which users to target.

Then, as shown in FIG. 4, the user experience customization system 116 can perform step 408 of evaluating demand severity metric, modification effectiveness, and friction. As discussed above briefly, the user experience customization system 116 may track the short-term effectiveness and long-term damage caused by various modifications to the user interface experience. Further, the user experience customization system 116 may escalate to more "severe" modifications with higher short-term effectiveness in situations where the demand severity metric requires or merits such modifications, even if those "severe" modifications are associated with higher long-term damage to the requester experience. The user experience customization system 116 can determine short-term effectiveness and long-term friction for various modifications in light of the targeted requester devices 102 and the relevant location. That is, the user experience customization system 116 can determine characteristics of various modifications not just in general, but as applied to specific requester devices 102.

Then, based on the above determined information, the user experience customization system 116 can perform step 410 of determining modifications for the targeted requester. The user experience customization system 116 can select optimal modifications that modulate the demand in an area to match the supply for that area, and that maximize short-term effectiveness while minimizing long-term friction/ damage as much as possible at the current demand severity metric. The user experience customization system 116 can determine any number or combination of modifications to the user interface experience.

In order to best optimize these selections, the user experience customization system 116 can consider the targeted requester data, including any user profile characteristics associated with any of the targeted requester devices 102. Of particular note, the user experience customization system 116 may take into consideration responses received via a particular requester device 102a in response to previous modifications to the user interface experience. Additionally the user experience customization system 116 can consider ride data from each of the requester devices 102 in determining which modifications to apply to each of the requester devices 102. Further, the user experience customization system 116 can consider the determined short-term effectiveness at modulating demand and long-term frustration or damage likely to be caused by each of the modifications with regard to each of the targeted requester devices 102. By utilizing each of these considerations, the user experience customization system 116 is able to more flexibly and accurately determine what modifications to apply to a particular mobile application session.

As discussed in detail above, the user experience customization system 116 can determine which modifications to apply to a mobile application session and can apply a wide variety of modifications depending on various circumstances. FIGS. 5A-5G show a variety of example embodiments of graphical user interfaces implementing various modifications to a user interface experience.

Figure 5A:
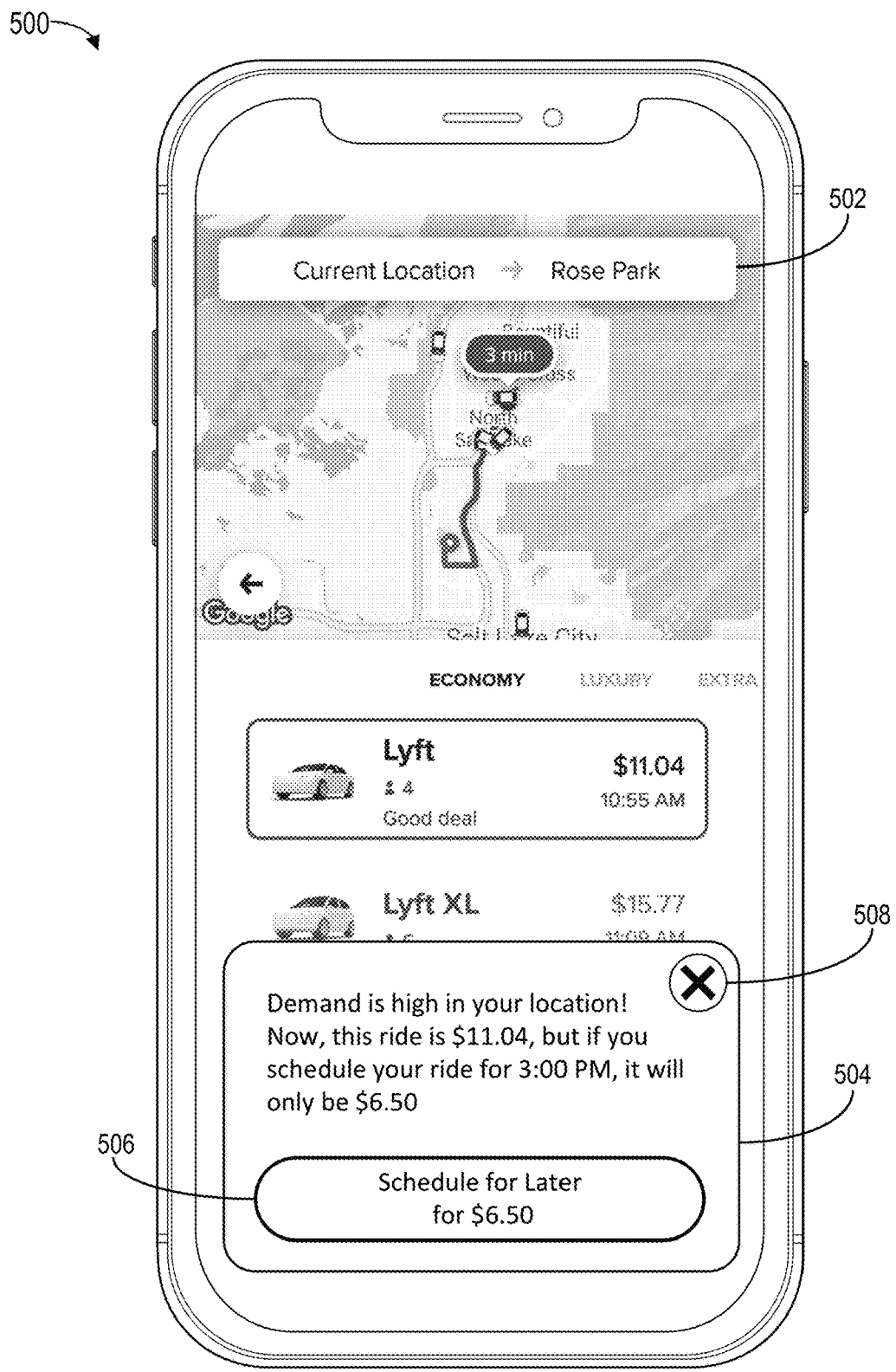
FIGS. 5A-5G illustrate example customized user interfaces in accordance with one or more embodiments.

For example, FIG. 5A shows an example implementation of a modification introducing an offer to schedule a potential request at a later time. As shown in FIG. 5, the graphical user interface 500 includes the request location bar 502. The requester may input a pickup and drop-off location into the request location bar 502. Though FIG. 5 shows the request location bar as a rectangle with the pickup and drop-off locations displayed on either side of an arrow, it will be appreciated that the user experience customization system 116 could present request location bar 502 according to a variety of designs in various embodiments. In one or more embodiments, in response to requester input indicating a pickup and drop-off location, the user experience customization system 116 displays various offers of transportation from the pickup location to the drop-off location.

As shown in FIG. 5A, the graphical user interface may include the schedule later modification box 504. The user experience customization system 116 can present this modification at a variety of points in the user interface experience. For example, the user experience customization system 116 can present this modification after the requester has input request details into the request location bar 502, after the requester has selected an offer, or after the requester has confirmed selection of an offer.

The schedule later modification box, as illustrated in FIG. 5A is a rectangle with rounded edges and text overlaying the graphical user interface. However, it will be appreciated that the schedule later modification box, and indeed any modification box disclosed herein, may be displayed according to a variety of designs in various embodiments. For example, the user experience customization system 116 can present the schedule later modification box 504 as a full screen rather than an overlay, could include a different combination of interactable elements, or according to any other design that presents the offer to schedule a request at a later time and includes an interactable element to accept the offer.

Further, the schedule later modification box 504 includes an offer to schedule the potential ride at a later time for a lower rate. In one or more embodiments, the user experience customization system 116 can present this incentive to delay a ride in order to modulate over-demand at the requested time. In one or more embodiments, the user experience customization system 116 determines a later time at which the demand severity metric in a requester's area will be lower and can calculate a ride cost at that time. The user experience customization system 116 can then generate the schedule later modification box 504 with details as to when the demand will be lower, and how much the ride would cost to schedule at that time. For example, FIG. 5A shows the schedule later modification box 504 with an offer to schedule at 3:00 PM for $6.50, rather than immediately for $11.04.

Additionally, the schedule later modification box 504 can include a schedule later confirmation button 506 and a cancellation button 508. In response to receiving user input at the schedule later confirmation button 512, the user experience customization system 116 can proceed to schedule the request for the later time specified in the schedule later modification box. In response to receiving user input at the cancellation button 508, the user experience customization system 116 can return the user to the default graphical user interface. In one or more embodiments, in response to receiving user input at the cancellation button 508, the user experience customization system 116 can also remove ride details and require that the requester re-input the details before attempting the request again. Further, in one or more additional embodiments, and especially in response to a very high demand severity metric, the user experience customization system 116 may determine not to include the cancellation button 508 in the interface, so that the requester devices 102 must either delay the request or exit the mobile application.

Figure 5B:
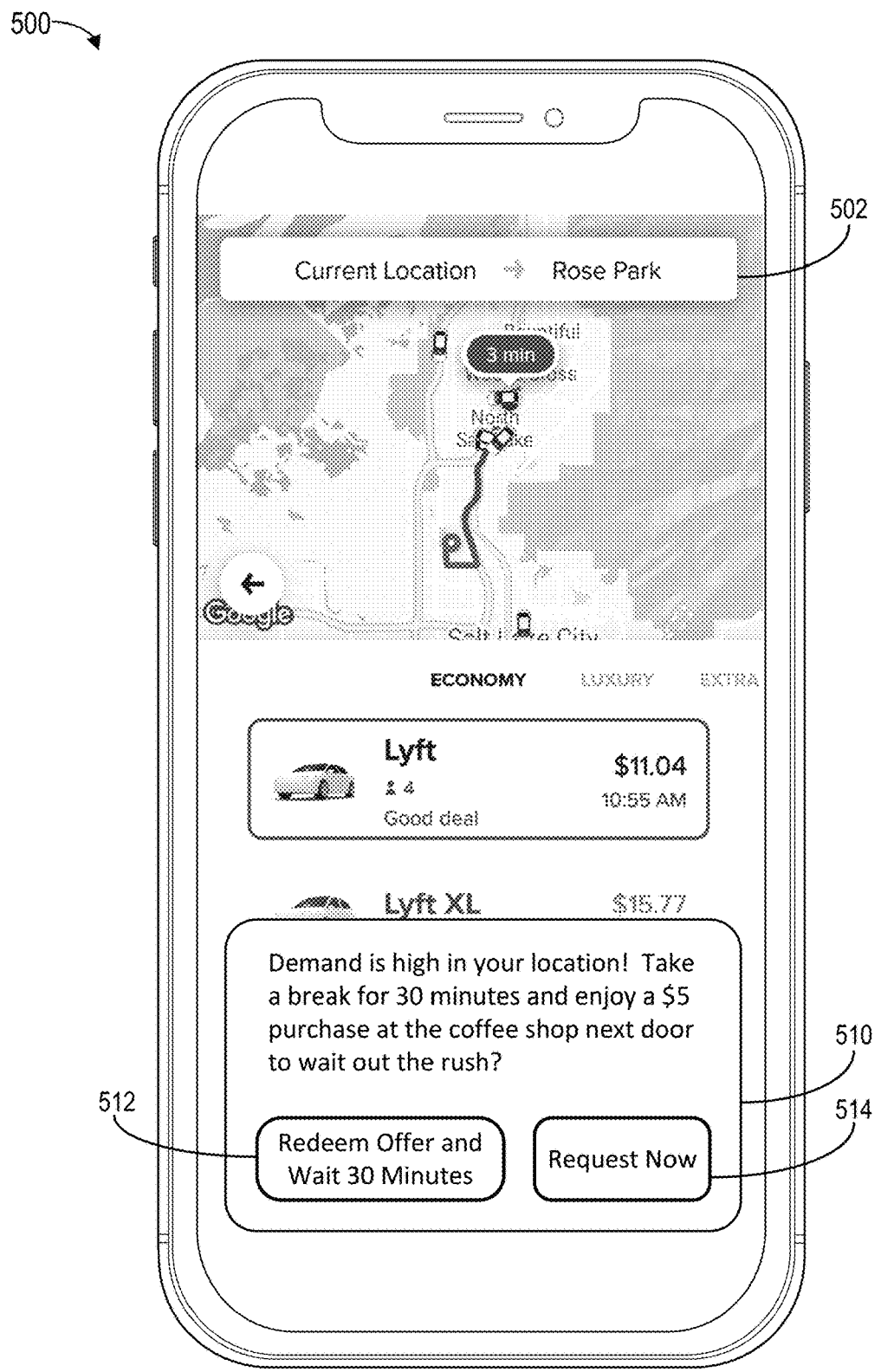

Turning to FIG. 5B, the user experience customization system 116 can modify the user interface experience by presenting requester devices 102 with an incentive to wait to request a service. More specifically, the user experience customization system 116 can identify a nearby location at which a potential requester could wait and can determine and present an incentive for the potential requester to wait at that location. When identifying a potential location, the user experience customization system 116 can consider user profile characteristics from a user profile associated with the requester device 102a in order to determine what nearby locations the potential requester might be interested in waiting at.

As shown in FIG. 5B, the user experience customization system 116 can present an incentive to wait modification box 510. In one or more embodiments, the incentive to wait modification box 510 includes a notification that demand is currently high at the requester's location and an offer to wait for a specified time at a nearby location in exchange for an incentive. For example, and as illustrated in FIG. 5B, the user experience customization system 116 can offer a discounted or free purchase at the location. The user experience customization system 116 can also offer free or discounted admission to a location, notify the requester of an event nearby, or present any other incentive to postpone requesting until a lower demand time.

In one or more embodiments, the user experience customization system 116 can determine an offer for the requester based on various criteria, including user profile information, user interests, demographic information, previous interactions with user experience modifications, requester ride history information, and/or location data for potential offer locations. The user experience customization system 116 can utilize all of this information to determine offers that are more likely to interest the user. For example, the user experience customization system 116 can choose to offer a discount to wait at a coffee shop, restaurant, bar, arcade, grocery store, mall, or any nearby location that may be of interest to the requester. To illustrate, based on a user's request history, the user experience customization system 116 can identify a location (e.g., a restaurant or coffee shop) where the user has been dropped off in the past, thereby indicating the user's interest in the location. Based on this determined user interest, the user experience customization system 116 can provide the user an offer associated with the location, thereby increasing the effectivess of the offer/modification to the user's user interface experience in modulating demand for the area.

As mentioned briefly above, the user experience customization system 116 can utilize user profile information to determine modifications for a user. To further illustrate, in one or more embodiments, the user experience customization system 116 utilizes user profile information (e.g. demographic information) to determine an offer to present to a requester. The user experience customization system 116 can identify offers that similar requesters and/or requesters in similar situations accepted. For example, the user experience customization system 116 can determine that requesters in this area between 26-31 years of age requesting after 5:00 pm are likely to accept an offer to wait at a nearby bar. Additionally, the user experience customization system 116 can utilize information from prior interactions with user experience modifications to determine what offer to present to the requester. For example, the user experience customization system 116 can determine that the requester denied a prior offer to wait at a bar and can select a different offer instead.

Further, as mentioned above, the user experience customization system 116 can utilize requester ride history information, and/or location data for potential offer locations. That is, the user experience customization system 116 can select an offer for a requester based at least in part on rides in the requester's history. For example, the user experience customization system 116 can determine that the requester had taken rides to a nearby coffee shop in the past. Then, based on that determination, the user experience customization system 116 can select an offer for the requester to wait at the coffee shop. Additionally, the user experience customization system 116 can utilize requester ride data to determine whether the requester has just been to a particular location and can determine not to select a similar location based on that determination. For example, the user experience customization system 116 can determine that the requester is likely to have just left a coffee shop based on a ride request less than an hour ago to a coffee shop. Based on this determination, the user experience customization system 116 can select an offer for the requester that is not at a coffee shop.

The user experience customization system 116 can select offers for a user at least in part based on convenience of pickup at the waiting location. That is, the user experience customization system 116 can determine nearby locations that would be convenient pick up locations after the waiting period, both for the requester and for potential providers. For example, the user experience customization system 116 can determine that a location is at or is close to a common pick up and/or drop off location in the region and can select that location based at least in part on that determination.

Additionally, as shown in FIG. 5, the incentive to wait modification box 510 can include a redeem offer button 512 and a request now button 514. In response to receiving user interaction at the redeem offer button 512, the user experience customization system 116 can present the user with instructions on how to redeem the offer, details of the offer, navigation information on how to get to the offer location, or any other relevant information. Further, in response to receiving user input at the redeem offer button, the user experience customization system 116 may prohibit the user from making a service request until the determined time period has elapsed. In one or more embodiments, the user experience customization system 116 will not automatically schedule the request for a later time but will instead allow the potential requester to make the request when the time period has elapsed. Further, in one or more embodiments, if the potential requester attempts to make a request before the determined time period has elapsed, the user experience customization system 116 may present the requester devices 102 with a reminder about the accepted incentive, information about the incentive, and/or information about when the requester devices 102 will be eligible to make service requests. In one or more embodiments, the user experience customization system can also automatically submit the transportation request after the determined time period has elapsed. The user experience customization system can submit the request with or without additional confirmation from the user.

In response to receiving user interaction at the request now button 514, the user experience customization system 116 can allow the requester devices 102 to continue with the request as normal. It will be appreciated that although FIG. 5A shows the schedule later modification box 504 including a cancellation button 508 and FIG. 5B shows the incentive to wait modification box including a request now button 514, either modification box could include either, neither, or even both of the cancellation button 508 and the request now button 514. Further, similar to discussion above with regard to FIG. 5A, though FIG. 5B shows the incentive to wait modification box 510 with one particular design, it will be appreciated that the user experience customization system 116 could present the incentive to wait modification box 510 in accordance with a variety of deigns.

Figure 5C:
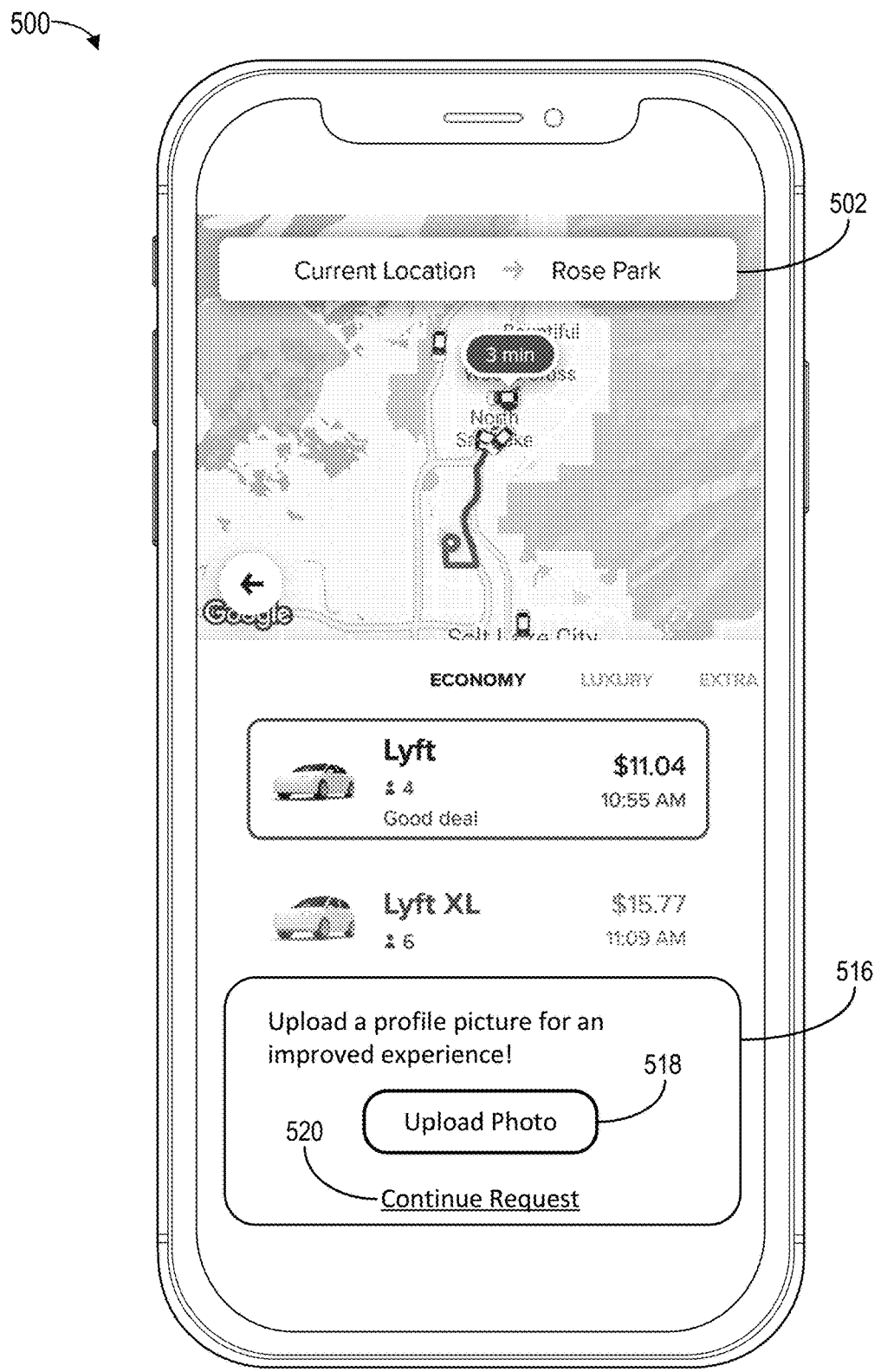

Turning now to FIG. 5C, the user experience customization system 116 may modify the user interface experience by requiring or suggesting that requester devices 102 perform additional action before permitting the requester devices 102 to complete a request. For example, as shown in FIG. 5C, the user experience customization system 116 can suggest that the requester devices 102 upload a profile picture to the associated user profile. In other embodiments, the user experience customization system 116 may present advertisements, games, notifications, or any other additional action.

The user experience customization system 116 can include, in the graphical user interface 500, an additional action modification box 516. The additional action modification box 516 can include information about the additional action, and in some embodiments can include details as to whether the action is required or suggested. The additional action modification box can also include a compliance button 518 or a continue request button 520. In response to receiving user input at the compliance button 518, the user experience customization system 116 may present information on how to complete the action and/or various user interface elements facilitating the action.

In response to receiving user input at the continue request button, the user experience customization system 116 can return the user to their previous screen within the graphical user interface 500 and allow the requester devices 102 to complete the request. As shown in FIG. 5C, in one or more embodiments, the user experience customization system 116 can present the continue request button less prominently than the compliance button 518. Further, in one or more embodiments, the user experience customization system 116 can omit the continue request button altogether, therefore requiring the action be performed before allowing the requester devices 102 to submit a request.

Similar to the discussion above with regard to FIGS. 5A-5B, the user experience customization system 116 may present the additional action modification box 516 in accordance with a variety of designs. Further, in various embodiments, the additional action modification box 516 can include a cancellation button 508, a request now button 514, a continue request button 520, or none of these buttons. The user experience customization system 116 can determine what interactable elements to include based on the demand severity metric, user data, ride data, and other considerations as described in detail above with regard to FIG. 4.

Figure 5D:
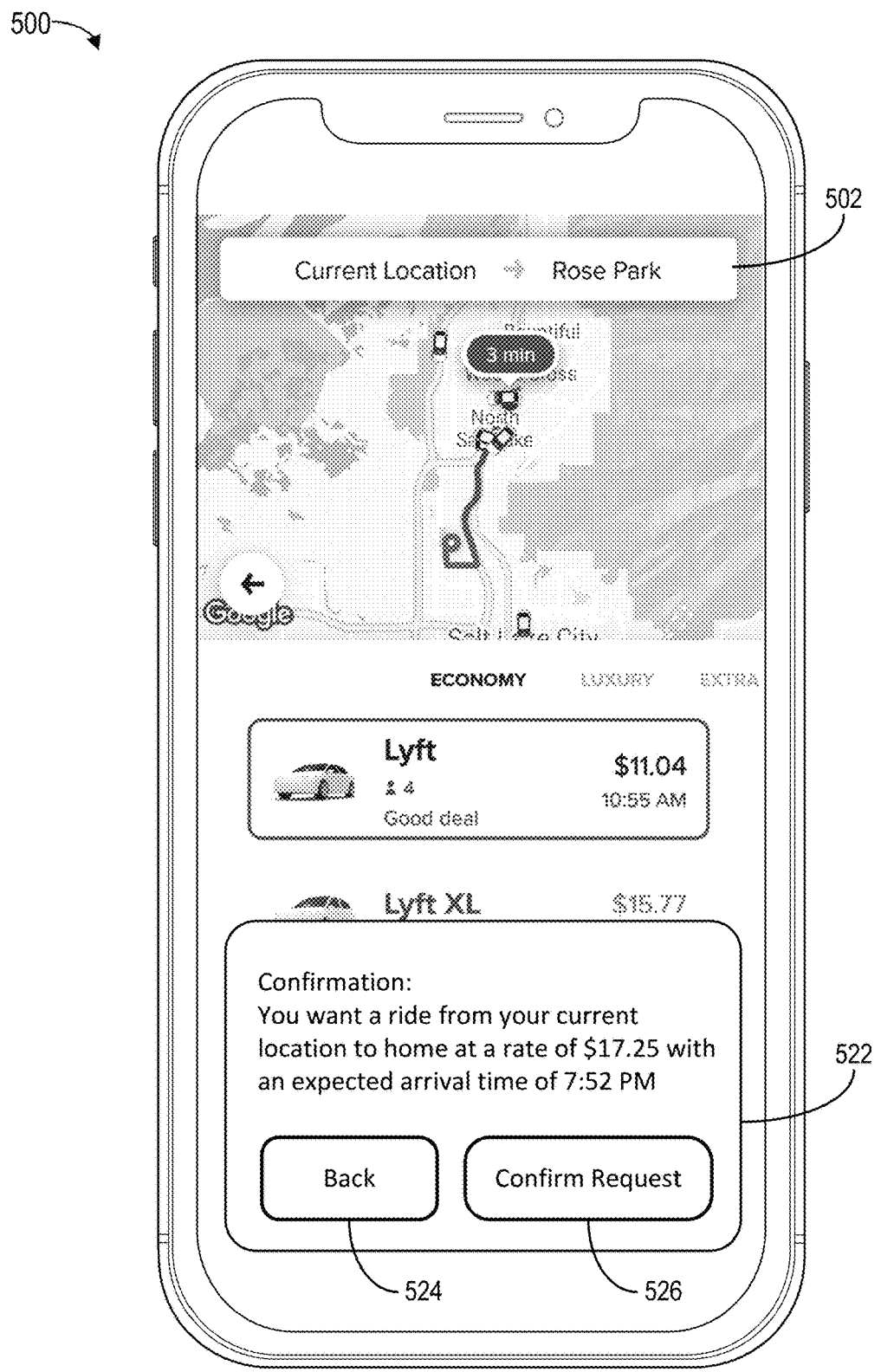

Turning to FIG. 5D, the user experience customization system 116 can require that the requester devices 102 present additional confirmation screens before submitting a request. The user experience customization system 116 may present, in the graphical user interface, an additional confirmation modification box 522. The additional confirmation modification box 522 can include details of the requested ride, including the drop-off and pickup locations, the cost of the ride, the expected arrival time, and/or any other ride details. The additional confirmation modification box 522 can include a back button 524 and a confirm request button 526. As discussed above with regard to FIGS. 5A-5C, the user experience customization system 116 can present the additional confirmation modification box 522 in accordance with a variety of designs. Further, the user experience customization system 116 can determine which elements to include based on a variety of criteria to optimize the modification as discussed in detail above with regard to FIG. 4.

Figure 5E:
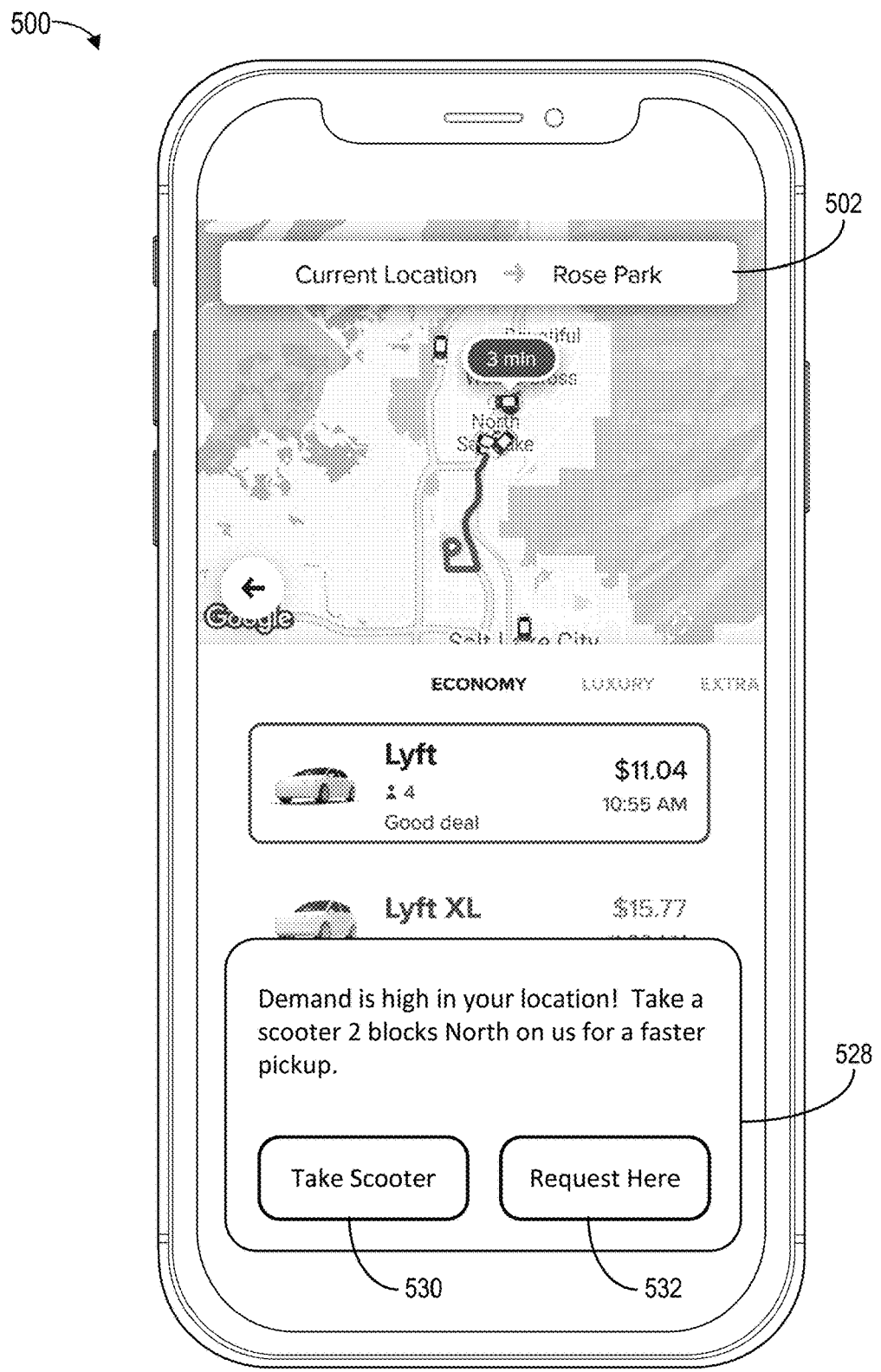

Additionally, turning to FIG. 5E, the user experience customization system 116 can present an alternate transportation method for part or the whole of the potential request. To illustrate, the user experience customization system 116 can present an offer to utilize a pedestrian conveyance such as a bicycle or scooter, walking, public transportation, ride sharing or any method other than the potentially requested method for any portion of a ride. The user experience customization system 116 can determine a location along the route of the potentially requested ride at which the demand severity metric is lower and, consequently, where the potential requests from the requester devices 102 can be more easily or efficiently fulfilled.

For example, at the conclusion of a large event such as a concert, festival, or sporting event, there may be high demand for pickup in a very small geographical area. In such a situation, the user experience customization system 116 can present requester devices 102 with an offer to share a ride. In another embodiment, the user experience customization system 116 can present the requester devices 102 with an offer to utilize an available nearby pedestrian conveyance, such as an electric scooter, to get to a location where the request can be fulfilled.

The user experience customization system 116 may present an alternate transportation method modification box 528. The alternate transportation method modification box 528 can include a notification that demand is high and/or that requesting a ride at the current location will be slow and/or more expensive. The alternate transportation method modification box 528 may also include details of the alternate transportation method and/or information on how the alternate transportation method will improve the potential requester's experience. The alternate transportation method modification box 528 may also include an accept alternate transportation button 530 and a request here button 532.

In response to receiving user input at the accept alternate transportation button 530, the user experience customization system 116 can present additional details regarding how to locate the alternate transportation method and where to go utilizing the alternate transportation method. Additionally, in response to receiving user input at the request here button 532, the user experience customization system 116 can return the graphical user interface 500 to the previous screen so that the requester devices 102 can complete the request. As discussed above with regard to FIGS. 5A-5D, in one or more embodiments, the user experience customization system 116 may omit the request here button 532, and consequently require the requester devices 102 to utilize the alternate transportation method in order to make the request. In other embodiments, the alternate transportation method modification box 528 may include other buttons or may be presented in accordance with other designs, as determined by the user experience customization system 116.

Figure 5F:
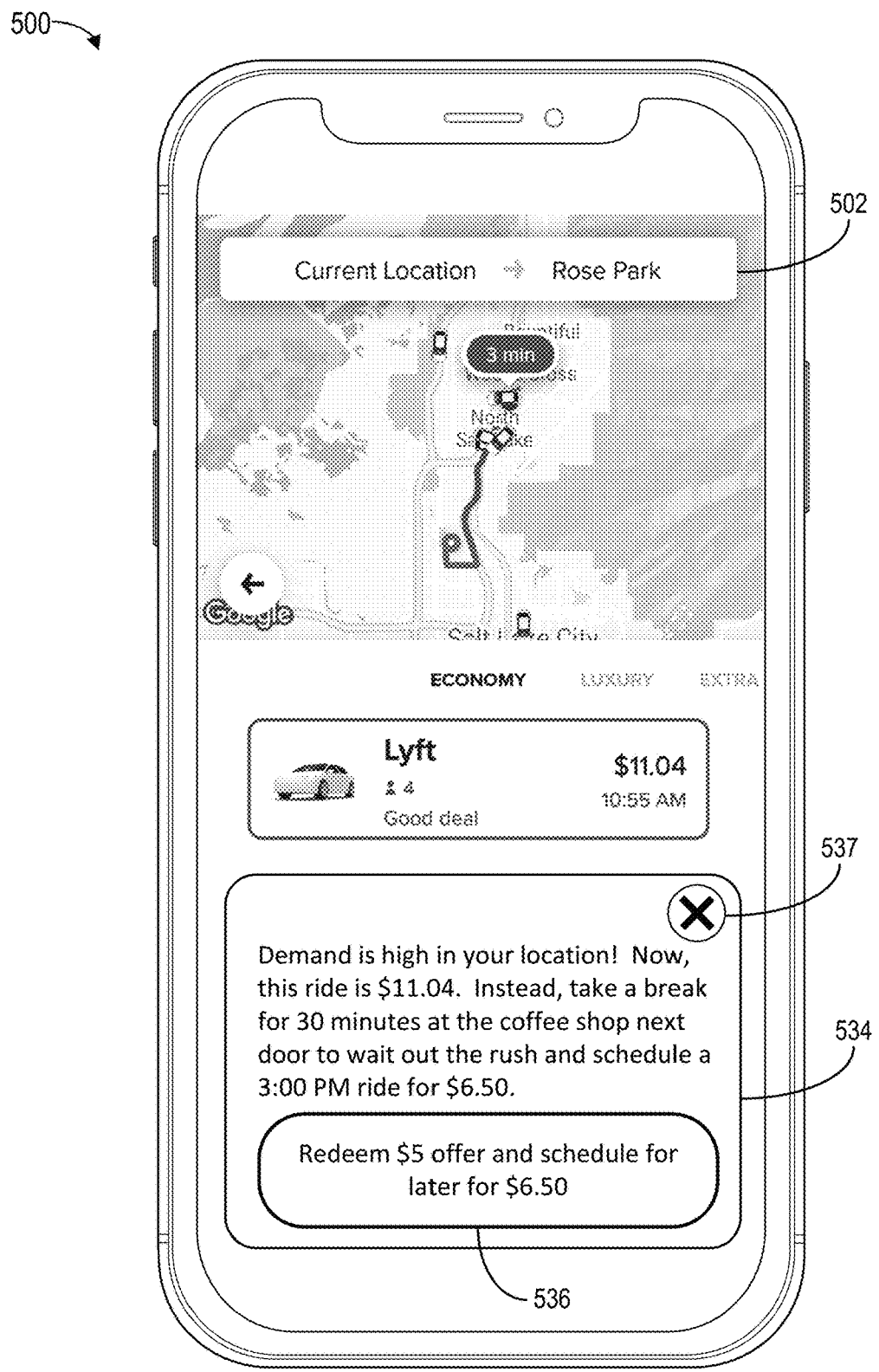

As discussed above briefly, and turning to FIG. 5F, the user experience customization system 116 can present multiple modifications to the user interface experience at once. For example, as shown in FIG. 5F, the user experience customization system 116 may present an offer to schedule a request at a later time for a lower price and an incentive to wait at the same time. As discussed above, the user experience customization system 116 can generate a modification notification based on any determined modification to the user interface experience. Similarly, when the user experience customization system 116 implements multiple modifications, the user experience customization system 116 may generate a combination modification box 534.

The combination modification box 536 can include details of each of the modifications, an accept button 536 and a cancel button 537. In response to receiving user interaction at the accept button 536, the user experience customization system 116 can present details and/or further instructions for the modifications, as discussed above. Additionally, in response to receiving user input at the cancel button 537, the user experience customization system 116 can return the graphical user interface to the previous page and allow the requester devices 102 to complete a request. As discussed above, the user experience customization system 116 can generate the combination modification box 536 according to a variety of designs and may include a variety of combinations of buttons. For example, in a variety of circumstances, the user experience customization system 116 can present a user experience modification box with no option to request now. That is, the user experience customization system 116 can determine to remove options altogether Now turning to FIG. 5G, as discussed above, the user experience customization system 116 can modify various elements of the graphical user interface. To illustrate, in response to a higher demand severity metric, the graphical user interface can make some graphical user interface elements more prominent or less prominent than they would be in the default version of the graphical user interface 500. The user experience customization system 116 can also eliminate some elements altogether or introduce new graphical user interface elements. The user experience customization system 116 can also suppress promotional activity within the graphical user interface, such as special offers or shortcut buttons.

In one or more embodiments, the graphical user interface 500 may include a map 538, which can display a map of the potential route and/or of the current location of the requester devices 102. The graphical user interface may also include selectable offers 540, which display various offers for services that the requester devices 102 may select. Though FIG. 5G shows two selectable offers 540, it will be appreciated that the graphical user interface 500 could include any number of selectable offers 540.

Further, the graphical user interface 500 may include the schedule button 542. Upon receiving user input at the schedule button 542, the user experience customization system 116 can present the requester devices 102 with options to request a ride at a later time. The graphical user interface can also include a confirmation button 426. Upon receiving user input at the confirmation button 426, the user experience customization system 116 can proceed with the request of the selected offer immediately or as soon as possible.

Figure 5G:
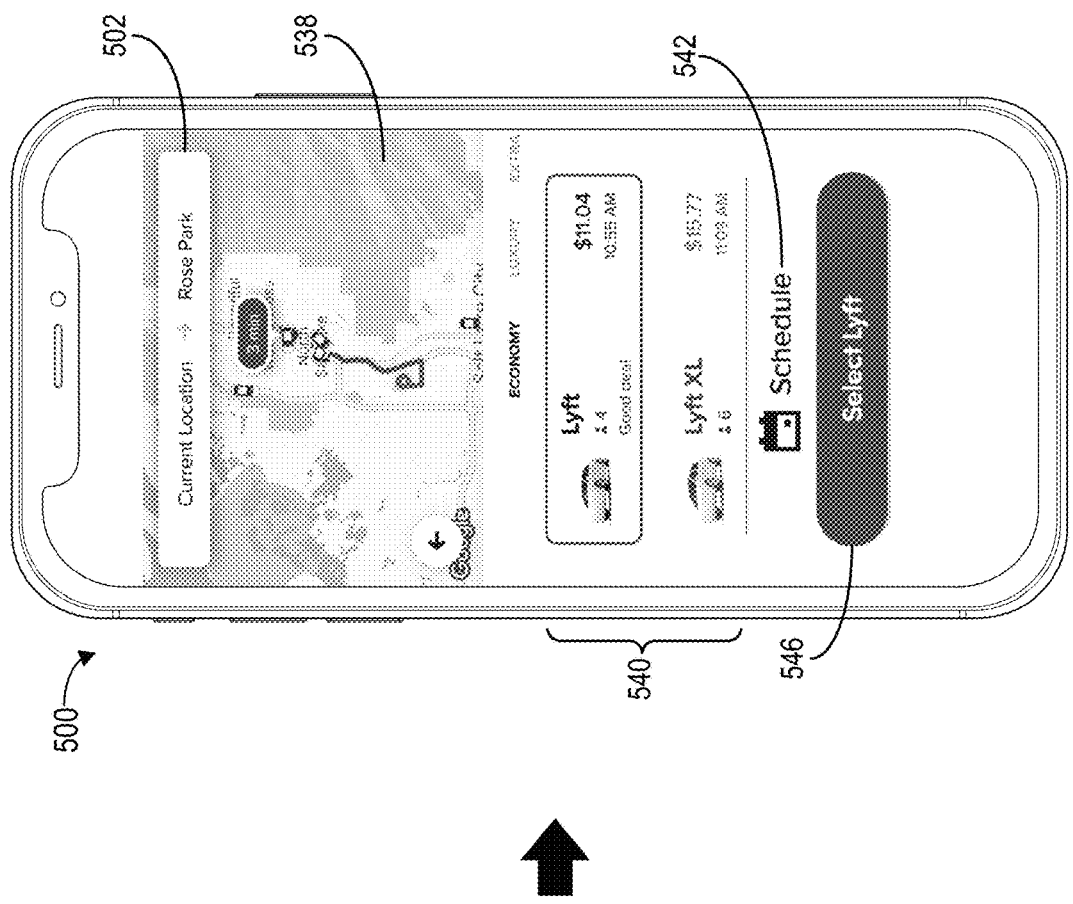
Figure 5G:
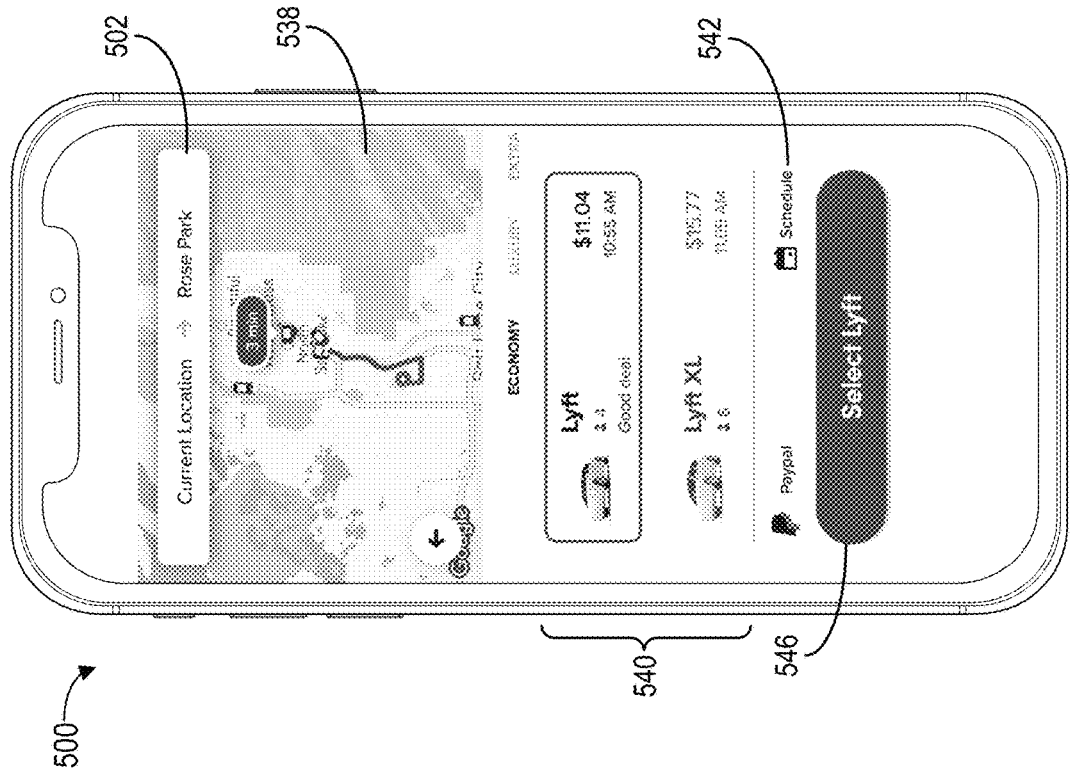

As shown in FIG. 5G, the user experience customization system 116 can modify graphical user interface elements to modulate demand. FIG. 5G illustrates the user experience customization system 116 modifying the graphical user interface in response to a heightened demand severity metric. More specifically, in one or more embodiments, the user experience customization system 116 can modify the schedule button 426 to make it more prominent, in order to divert more rides to a later scheduled time. For example, the user experience customization system 116 can modify the size of the schedule button 426 relative to the size of the request button 546. The user experience customization system 116 can implement a variety of changes to the graphical user interface to modulate demand.

Figure 6:
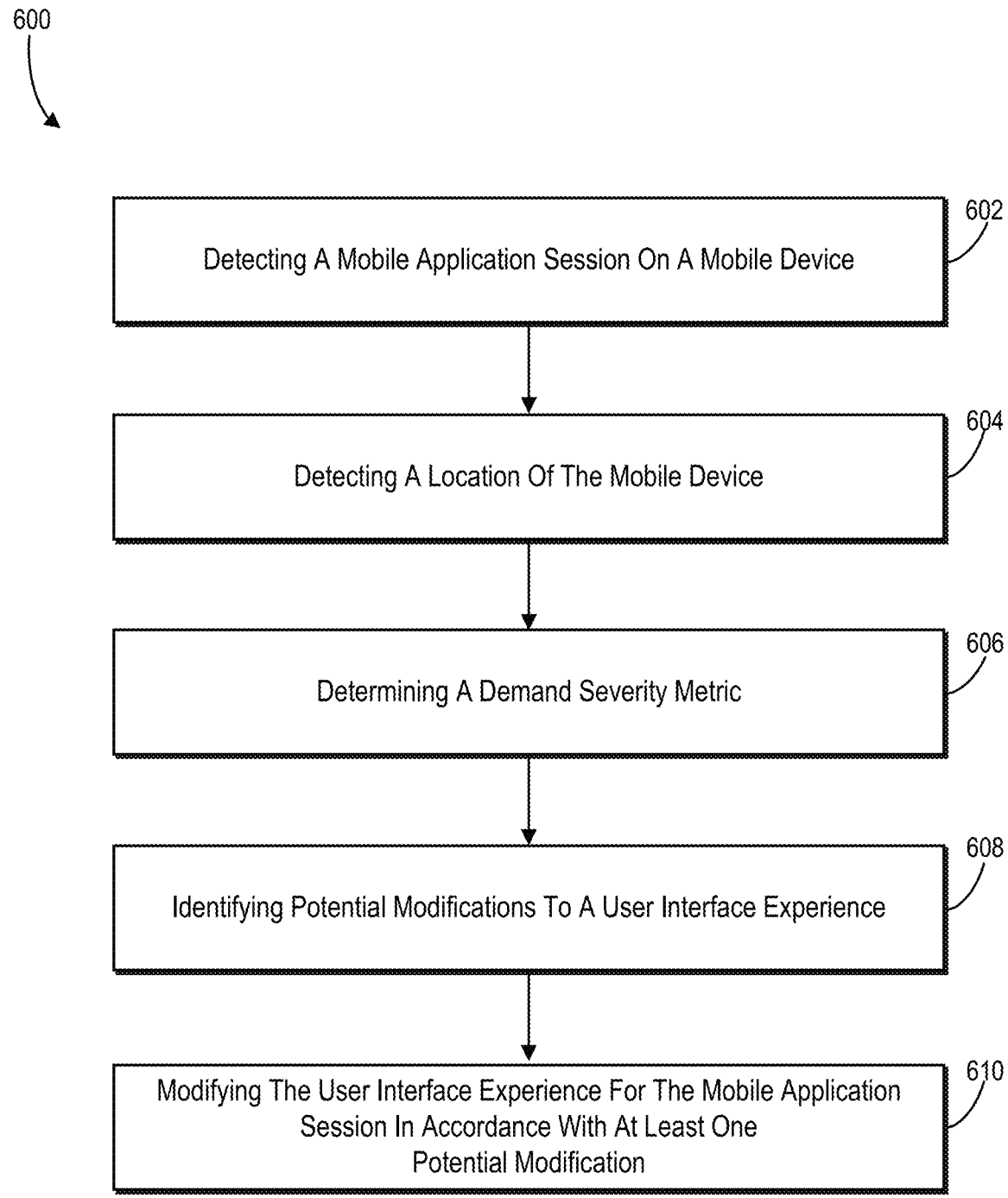
FIG. 6 illustrates a flowchart of a series of acts for dynamically customizing a user interface in accordance with one or more embodiments.

As mentioned, FIG. 6 illustrates a flowchart of a series of acts 600 in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the series of acts 600 includes an act 602 for detecting a mobile application session on a mobile device. In particular, the act 602 can include detecting, by a transportation matching system comprising one or more servers, a mobile application session on a requester device. Specifically, the act 602 can include detecting, via the requester device, a ride selection, wherein identifying the one or more modifications to the user interface experience for the mobile application session is further based on one or more characteristics of the selected ride.

Additionally, as shown in FIG. 6, the series of acts 600 includes an act 604 for detecting a location of the mobile device. In particular, the act 604 can include detecting, by the transportation matching system, a location of the requester device. Specifically, the act 604 can include utilizing information received from the requester device to determine its location.

Further, as shown in FIG. 6, the series of acts 600 includes an act 606 for determining a demand severity metric. In particular, the act 606 can include determining, based on the location of the requester device, a demand severity metric. Specifically, the act 606 can include predicting a time interval after which the demand severity metric will decrease, wherein modifying the user interface experience for the mobile application session further comprises presenting one or more incentives to delay a request to a time with a lower demand severity metric. The act 606 may also include determining an update to the demand severity metric during the mobile application session, identifying, based on the updated demand severity metric, one or more modifications to a user interface experience for the mobile application session on the requester device, and modifying, in accordance with at least one of the one or more modifications, the user interface experience for the mobile application session on the requester device Also, as shown in FIG. 6, the series of acts 600 includes an act 608 for identifying modifications to a user interface experience. In particular, the act 608 can include identifying, based on the demand severity metric, one or more modifications to a user interface experience for the mobile application session on the requester device. Specifically, the act 608 can include identifying modifications, wherein identifying the one or more modifications is further based on one or more user profile information associated with the mobile application session. Additionally, the act 608 may include detecting, by a transportation matching system comprising one or more servers, a second mobile application session on a second requester device, detecting, by the transportation matching system, the location of the second requester device, determining, based on the location of the second requester device, the demand severity metric, identifying, based on the demand severity metric, one or more modifications to a user interface experience for the mobile application session on the requester device, and determining, based on one or more user profile information for the second user, not to modify the standard experience for the second user.

Further, as shown in FIG. 6, the series of acts 600 includes an act 610 for modifying the user interface experience for the mobile application session in accordance with the modifications. In particular, the act 610 can include determining, modifying, in accordance with at least one of the one or more modifications, the user interface experience for the mobile application session on the requester device. Specifically, the act 610 can include requiring or including one or more additional actions before allowing the requester device to make a request. The act 610 may also include presenting an offer to utilize an alternate transportation method to an alternate location with a lower demand severity metric Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
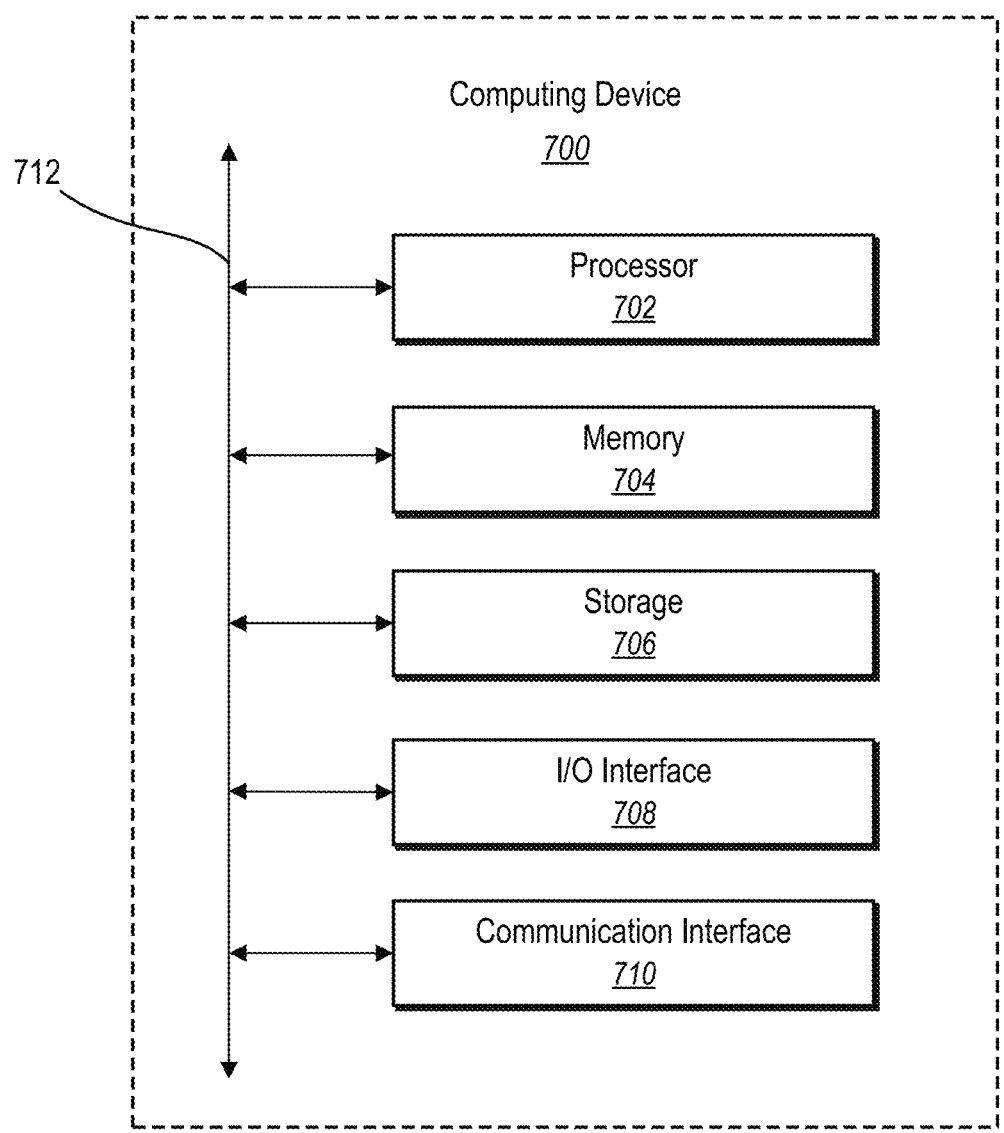
FIG. 7. illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., requester devices 102, provider devices 106, and server devices 112). In one or more embodiments, the computing device 700 may be a mobile device (e.g., a mobile telephone, a smartphone, a PDA, a tablet, a laptop, a camera, a tracker, a watch, a wearable device, an augmented reality wearable device, an augmented reality display device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of computing device 700 to each other.

Figure 8:
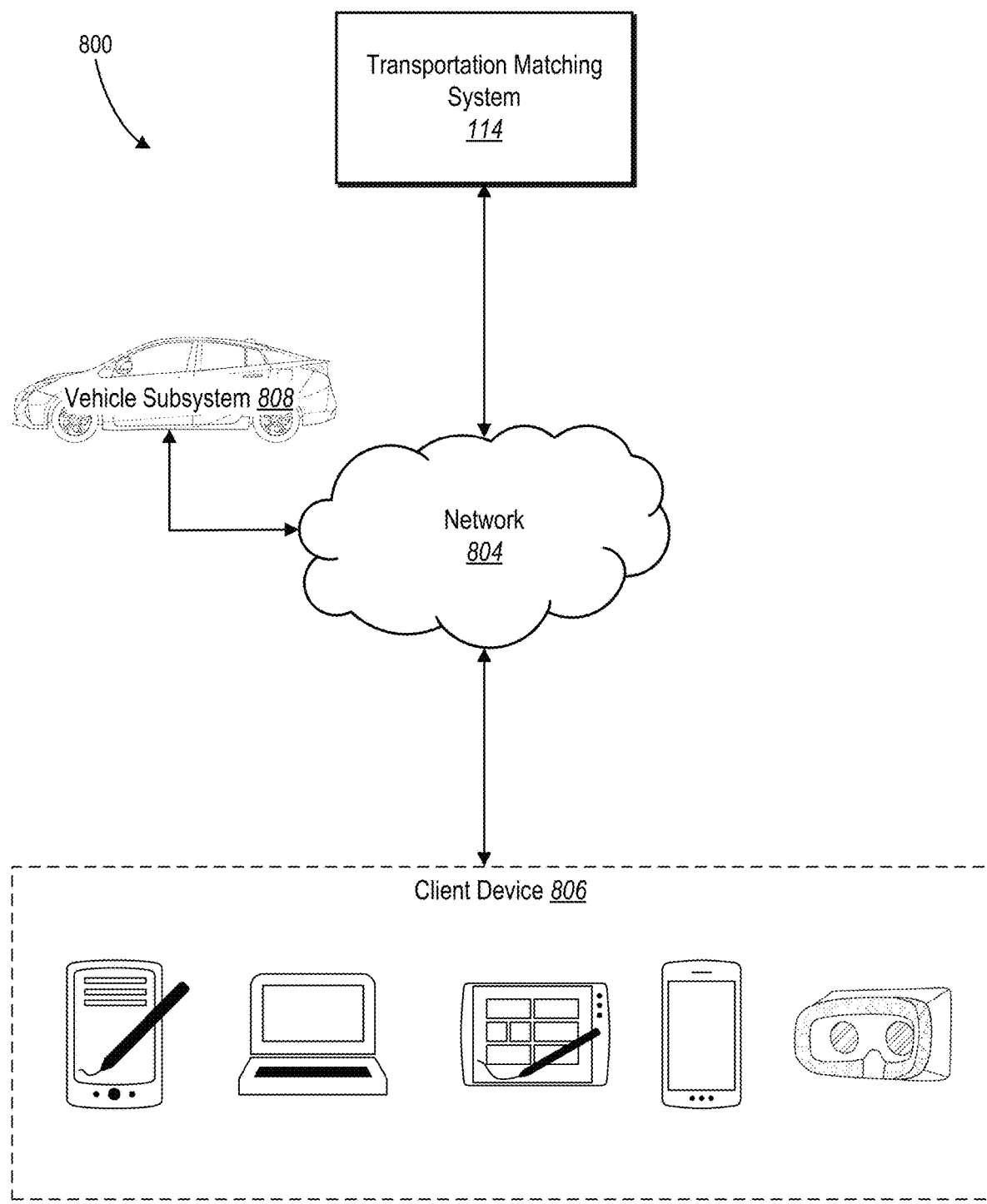
FIG. 8 illustrates a block diagram of an example transportation matching system in accordance with one or more embodiments.

FIG. 8 illustrates an example network environment 800 of a transportation matching system (e.g., the transportation matching system 114). The network environment 800 includes a client device 806, a transportation matching system 802, and a vehicle subsystem 808 connected to each other by a network 804. Although FIG. 8 illustrates a particular arrangement of the client device 806, the transportation matching system 802, the vehicle subsystem 808, and the network 804, this disclosure contemplates any suitable arrangement of the client device 806, the transportation matching system 802, the vehicle subsystem 808, and the network 804. As an example, and not by way of limitation, two or more of the client device 806, the transportation matching system 802, and the vehicle subsystem 808 communicate directly, bypassing the network 804. As another example, two or more of the client device 806, the transportation matching system 802, and the vehicle subsystem 808 may be physically or logically co-located with each other in whole or in part. Moreover, although FIG. 8 illustrates a particular number of the client devices 806, the transportation matching systems 802, the vehicle subsystems 808, and the networks 804, this disclosure contemplates any suitable number of the client devices 806, the transportation matching systems 802, the vehicle subsystems 808, and the networks 804. As an example, and not by way of limitation, the network environment 800 may include multiple client devices 806, the transportation matching systems 802, the vehicle subsystems 808, and the networks 804.

This disclosure contemplates any suitable network 804. As an example, and not by way of limitation, one or more portions of the network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 804 may include one or more networks 804.

Links may connect the client device 806, the transportation matching system 802, and the vehicle subsystem 808 to the communication network 804 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links.

Links need not necessarily be the same throughout the network environment 800. One or more first links may differ in one or more respects from one or more second links.

In particular embodiments, the client device 806 may be an electronic device including hardware, software, or embedded logic components or a combination of two or more such components and capable of carrying out the appropriate functionalities implemented or supported by the client device 806. As an example, and not by way of limitation, a client device 806 may include any of the computing devices discussed above in relation to FIG. 7. A client device 806 may enable a network user at the client device 806 to access a network. A client device 806 may enable its user to communicate with other users at other client systems 806.

In particular embodiments, the client device 806 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 806 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 806 one or more Hyper Text Markup Language (HTML) files responsive to the HTTP request. The client device 806 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 802 may be a network-addressable computing system that can host a ride share transportation network. The transportation matching system 802 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 802. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 802 may manage ride matching services to connect a user/requester with a vehicle and/or provider. By managing the ride matching services, the transportation matching system 802 can manage the distribution and allocation of vehicle subsystem resources and user resources such as GPS location and availability indicators, as described herein.

The transportation matching system 802 may be accessed by the other components of the network environment 800 either directly or via network 804. In particular embodiments, the transportation matching system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, or a transportation matching system 802 to manage, retrieve, modify, add, or delete, the information stored in data store.

In particular embodiments, the transportation matching system 802 may provide users with the ability to take actions on various types of items or objects, supported by the transportation matching system 802. As an example, and not by way of limitation, the items and objects may include ride share networks to which users of the transportation matching system 802 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 802 or by an external system of a third-party system, which is separate from the transportation matching system 802 and coupled to the transportation matching system 802 via a network 804.

In particular embodiments, the transportation matching system 802 may be capable of linking a variety of entities. As an example, and not by way of limitation, the transportation matching system 802 may enable users to interact with each other or other entities, or to allow users to interact with these entities through an application programming interfaces (API) or other communication channels.

In particular embodiments, the transportation matching system 802 may include a variety of servers, sub-systems, programs, modules, logs, and data stores. In particular embodiments, the transportation matching system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 802 may also include suitable components such as network interfaces, security mechanisms, load balancers, failover servers, management-and-network-operations consoles, other suitable components, or any suitable combination thereof. In particular embodiments, the transportation matching system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 802 and one or more client systems 806. An action logger may be used to receive communications from a web server about a user's actions on or off the transportation matching system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from the client device 806 responsive to a request received from the client device 806. Authorization servers may be used to enforce one or more privacy settings of the users of the transportation matching system 802. A privacy setting of a user determines how particular information associated with a user can be shared. The authorization server may allow users to opt in to or opt out of having their actions logged by the transportation matching system 802 or shared with other systems, such as, for example, by setting appropriate privacy settings. Third-party-content-object stores may be used to store content objects received from third parties. Location stores may be used for storing location information received from the client systems 806 associated with users.

In addition, the vehicle subsystem 808 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 808 can include an autonomous vehicle—i.e., a vehicle that does not require a human operator. In these embodiments, the vehicle subsystem 808 can perform maneuvers, communicate, and otherwise function without the aid of a human provider, in accordance with available technology.

In particular embodiments, the vehicle subsystem 808 may include one or more sensors incorporated therein or associated thereto. For example, sensor(s) can be mounted on the top of the vehicle subsystem 808 or else can be located within the interior of the vehicle subsystem 808. In certain embodiments, the sensor(s) can be located in multiple areas at once—i.e., split up throughout the vehicle subsystem 808 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 808 may include a communication device capable of communicating with the client device 806 and/or the transportation matching system 802. For example, the vehicle subsystem 808 can include an on-board computing device communicatively linked to the network 804 to transmit and receive data such as GPS location information, sensor-related information, requester location information, or other relevant information.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   detecting, by a transportation matching system comprising one or more servers, a mobile application session on a requester device;
   detecting, by the transportation matching system, a location of the requester device;
   determining, based on information associated with the location of the requester device, a demand severity metric for the mobile application session on the requester device;
   identifying, based on the demand severity metric, one or more modifications to a user interface experience for the mobile application session on the requester device; and
   modifying, in accordance with at least one of the one or more modifications, the user interface experience for the mobile application session on the requester device.

2. The method of claim 1, wherein identifying the one or more modifications is further based on user profile information associated with a user of the requester device.

3. The method of claim 1, further comprising:
   predicting a time interval after which the demand severity metric will decrease; and
   modifying the user interface experience for the mobile application session by presenting one or more incentives to delay a transportation request until after the time interval.

4. The method of claim 1, wherein modifying the user interface experience for the mobile application session comprises adding one or more additional actions required by a user of the requester device prior to submitting a transportation request.

5. The method of claim 1, wherein modifying the user interface experience for the mobile application session comprises presenting an offer to utilize an alternate transportation method to an alternate location having a lower demand severity metric.

6. The method of claim 1, further comprising:
detecting, by the transportation matching system and within a common location with the requester device, a second mobile application session on a second requester device associated with a second user; and
determining, based on user profile information associated with the second user, not to modify the user interface experience for the second user.

7. The method of claim 1, further comprising:
identifying location information for a transportation request associated with the requester device; and
determining whether to target the requester device based on the location information for the transportation request associated with the requester device.

8. A non-transitory computer-readable medium storing instructions that, when executed by at least one processor, cause a computer system to:
detect a mobile application session on a requester device;
detect a location of the requester device;
determine, based on information associated with the location of the requester device, a demand severity metric for the mobile application session on the requester device;
identify, based on the demand severity metric, one or more modifications to a user interface experience for the mobile application session on the requester device; and
modify, in accordance with at least one of the one or more modifications, the user interface experience for the mobile application session on the requester device.

9. The non-transitory computer-readable medium of claim 8, wherein identifying the one or more modifications is further based on user profile information associated with a user of the requester device.

10. The non-transitory computer-readable medium of claim 8, further comprising instructions that, when executed by the at least one processor, cause the computer system to:
predict a time interval after which the demand severity metric will decrease; and
modify the user interface experience for the mobile application session by presenting one or more incentives to delay a transportation request until after the time interval.

11. The non-transitory computer-readable medium of claim 8, wherein modifying the user interface experience for the mobile application session comprises adding one or more additional actions required by a user of the requester device prior to submitting a transportation request.

12. The non-transitory computer-readable medium of claim 8, wherein modifying the user interface experience for the mobile application session comprises presenting an offer to utilize an alternate transportation method to an alternate location having a lower demand severity metric.

13. The non-transitory computer-readable medium of claim 8, further comprising instructions that, when executed by the at least one processor, cause the computer system to:
detect, within a common location with the requester device, a second mobile application session on a second requester device associated with a second user; and
determine, based on user profile information associated with the second user, not to modify the user interface experience for the second user.

14. The non-transitory computer-readable medium of claim 8, further comprising instructions that, when executed by the at least one processor, cause the computer system to:
identify location information for a transportation request associated with the requester device; and
determine whether to target the requester device based on the location information for the transportation request associated with the requester device.

15. A system comprising:
at least one processor; and
at least one non-transitory computer-readable storage medium storing instructions that, when executed by the at least one processor, cause the system to:
detect a mobile application session on a requester device;
detect a location of the requester device;
determine, based on information associated with the location of the requester device, a demand severity metric for the mobile application session on the requester device;
identify, based on the demand severity metric, one or morel modifications to a user interface experience for the mobile application session on the requester device; and
modify, in accordance with at least one of the one or more modifications, the user interface experience for the mobile application session on the requester device.

16. The system of claim 15, wherein identifying the one or more modifications is further based on user profile information associated with a user of the requester device.

17. The system of claim 15, further comprising instructions that, when executed by the at least one processor, cause the system to:
predict a time interval after which the demand severity metric will decrease; and
modify the user interface experience for the mobile application session by presenting one or more incentives to delay a transportation request until after the time interval.

18. The system of claim 15, wherein modifying the user interface experience for the mobile application session comprises adding one or more additional actions required by a user of the requester device prior to submitting a transportation request.

19. The system of claim 15, further comprising instructions that, when executed by the at least one processor, cause the system to:
detect, within a common location with the requester device, a second mobile application session on a second requester device associated with a second user; and
determine, based on user profile information associated with the second user, not to modify the user interface experience for the second user.

20. The system of claim 15, further comprising instructions that, when executed by the at least one processor, cause the system to:
identify location information for a transportation request associated with the requester device; and
determine whether to target the requester device based on the location information for the transportation request associated with the requester device.

* * * * *